US012444484B2

(12) United States Patent
Wong et al.

(10) Patent No.: US 12,444,484 B2
(45) Date of Patent: Oct. 14, 2025

(54) SYSTEMS AND METHODS FOR VALIDATING AND UPDATING MEDICAL RECORD DATA

(71) Applicant: Change Healthcare Holdings, LLC, Nashville, TN (US)

(72) Inventors: Eldon A. Wong, Vancouver (CA); Geoff Murray, Richmond (CA)

(73) Assignee: Change Healthcare Holdings, LLC, Nashville, TN (US)

( * ) Notice: Subject to any disclaimer, the term of this patent is extended or adjusted under 35 U.S.C. 154(b) by 636 days.

(21) Appl. No.: 17/406,368

(22) Filed: Aug. 19, 2021

(65) Prior Publication Data
US 2023/0073670 A1 Mar. 9, 2023

(51) Int. Cl.
G06F 16/11 (2019.01)
G16H 10/60 (2018.01)
(52) U.S. Cl.
CPC .......... G16H 10/60 (2018.01); G06F 16/122 (2019.01)
(58) Field of Classification Search
None
See application file for complete search history.

(56) References Cited

U.S. PATENT DOCUMENTS

| 10,991,457 | B1 * | 4/2021 | Hallemeier | G16H 10/60 |
| 2008/0091944 | A1 * | 4/2008 | von Mueller | G06Q 20/12 |
| | | | | 713/168 |
| 2014/0164266 | A1 * | 6/2014 | Guzik | G06Q 30/018 |
| | | | | 705/317 |
| 2020/0233661 | A1 * | 7/2020 | Grosse | G06F 8/45 |
| 2021/0240658 | A1 * | 8/2021 | Nukala Venkata Naga | |
| | | | | G06F 16/2379 |

* cited by examiner

Primary Examiner — Amresh Singh
(74) Attorney, Agent, or Firm — MARSHALL, GERSTEIN & BORUN LLP

(57) ABSTRACT

A system for validating and updating records, such as medical records, is provided. The system includes a flexible operation and transaction based framework that allows for the handling of a variety of record validation and updating scenarios. The system provides many advanced features related to confidentiality, performance, and auditing. The system may perform one or more operations on the medical records in an order defined by a transaction file in order to achieve a goal such as medical record deduplication. Each operation may take an input one or more input files, output files of previous operations, or one or more medical records. Each operation may generate one or more output files including input data for a subsequent operation, and success or failure files that describe the actions performed by the operation. The success or failure files may also be used by subsequent operations.

14 Claims, 17 Drawing Sheets

1600

SYSTEMS AND METHODS FOR VALIDATING AND UPDATING MEDICAL RECORD DATA

BACKGROUND

Data integrity is an ongoing issue in a variety of fields. Due to a variety of issues data, such as medical records data, may become corrupted or incomplete. These issues include coding errors, timing issues, and data entry errors. Because of the importance in maintaining complete and accurate medical records, it is important that these errors be quickly identified and corrected.

SUMMARY

A system for validating and updating records, such as medical records, is provided. The system includes a flexible operation and transaction based framework that allows for the handling of a variety of record validation and updating scenarios. The system provides many advanced features related to confidentiality, performance, and auditing.

In an embodiment, the system may perform one or more operations on the medical records in an order defined by a transaction file in order to achieve a goal such as medical record deduplication. Each operation may take an input one or more input files, output files of previous operations, or one or more medical records. Each operation may generate one or more output files including input data for a subsequent operation, and success or failure files that describe the actions performed by the operation. The successor failure files may also be used by subsequent operations. Example operations include query operations, transform operations, update operations, and audit operations.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying figures, which are incorporated herein and form part of the specification, illustrate systems and methods for updating and validating medical records. Together with the description, the figures further serve to explain the principles of the systems and method described herein and thereby enable a person skilled in the pertinent art to make and use the systems and methods for updating and validating medical records.

DETAILED DESCRIPTION

Figure 1:
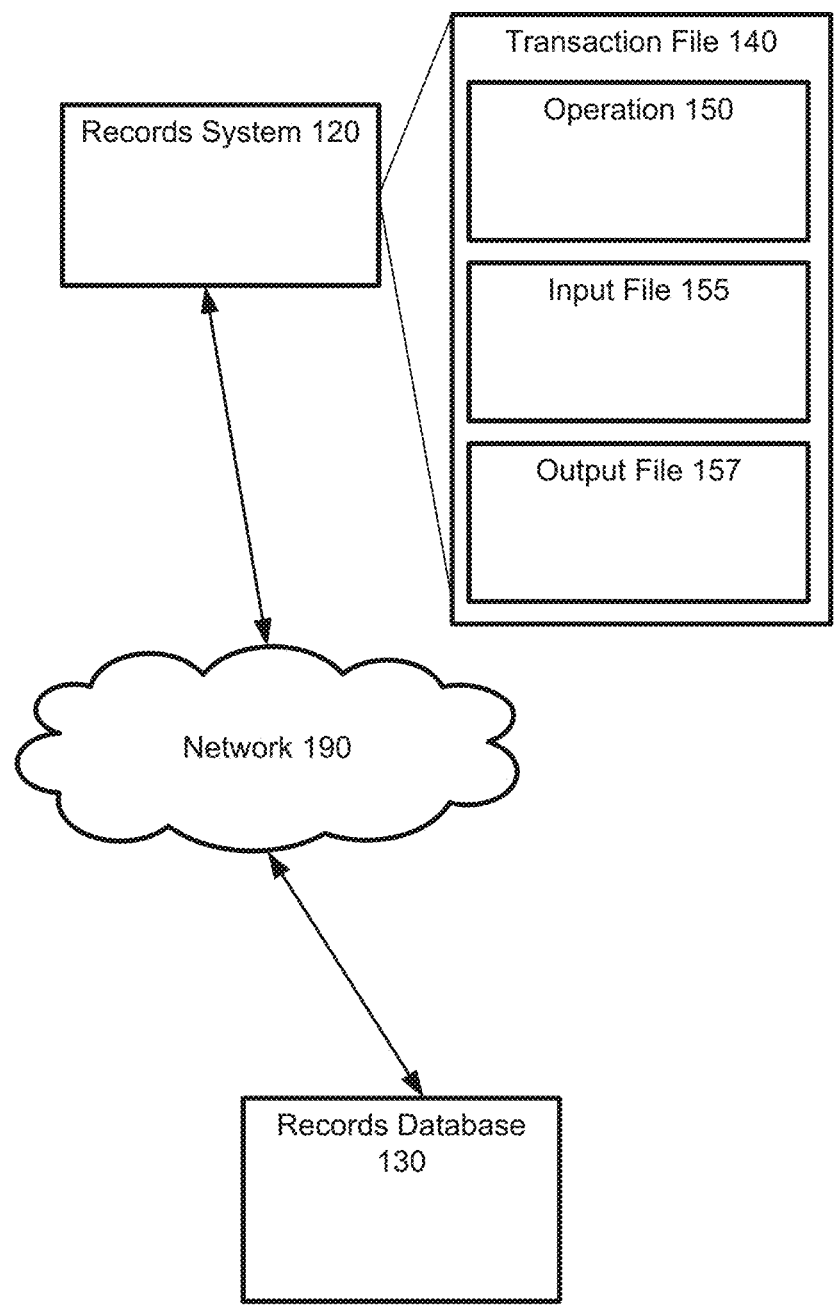
FIG. 1 is an example environment for validating and updating one or more records in a records database.

FIG. 1 is an example environment 100 for validating and updating one or more records in a records database 130. Depending on the embodiment, the records in a records database 130 may include medical records. Other types of records may be supported.

To facilitate the validating and updating of records, the environment 100 may include a records system 120. The records system 120 may perform actions such as record deduplication. As may be appreciated, an important part of data storage is removing duplicate records from the records database 130 for an entity or individual and ensuring that when a duplicate record is removed that the remaining record includes the most up-to-date information for the entity or individual associated with the record. The records system 120 may be implemented using one or more general purpose computing devices such as the computing device 1700 illustrated with respect to FIG. 17.

In some embodiments, the records system 120 may perform an action such as record duplication using what is referred to herein a a transaction file 140. The transaction file 140 may include a plurality of operations 150. An operation 150 is a particular step that is performed as part of the action associated with the transaction file 140. Each operation 150 may take as an input data from an input file 155, records database 130, or an output file 157 generated by another operation 150. Each operation 150 may perform some transformation or operation on the input data and may output some or all of the transformed data to the output file 157 or records database 130. The output data in the output file 157 may include status information such as records of successes or failures with respect to the transformations performed by the operation 150, as well as data for subsequent operations to use as inputs. The records of successes and failures may allow for the actions of each operation 150 to be documented and audited, and if necessary, reversed, or undone.

The operations 150 may classified into one of the following types including, but not limited to, query, transform, update, and audit. The query operation is an operation 150 that receives data not from an input file 155, but from a query performed on the records database 130. The query may or may not include a date range. The transform operation 150 may perform a transform operations 150 on the input file 155 to generate the data in the output file 157. The update operation 150 may consume an input file 155, may perform an update to the data in the records database 130, and may generate one or more audit record output files 157. The audit operation 150 may consume an input file 155 and may perform auditing on each data item in the input file 155.

In general, operations 150 may only consume and produce files, and may never receive data directly from another operation 150 or send data directly to another operation 150. This decouples the operations 150 of the transaction file 140 from each other and allows for functionality such as: operation playback; operation branching; and post obfuscation (for statistics, etc.). Other functionality may be supported.

In some embodiments, operations 150 may be associated with one or more operation data structures. The operation data structures for an m operation 150 may include the data representations that the operation 150 is tied to such as the particular input files 155 and output files 157 used or generated by the operation 150.

In addition, each operation 150 may be associated with one or more stages, and each stage may include one or more actions and will perform either inclusion or exclusion. An example of such an operation 150 includes a transformation filter operation.

Example transaction files 140 and operations 150 that may be used by the records system 120 are described further below. In particular, the use of the records system 120 to identify and remove duplicate records from the records database 130.

Figure 2:
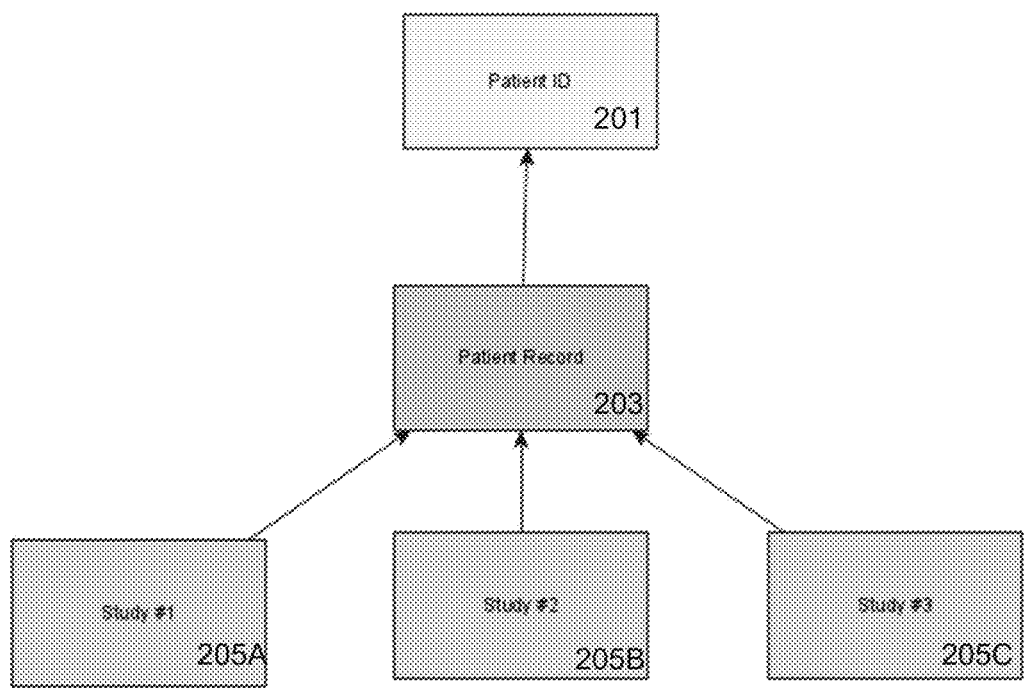
FIG. 2 is an illustration of example graph representing a medical record associated with a patient.

With reference to FIG. 2 is shown an example graph representing a "normal" medical record associated with a patient. The patient ID 201 may be associated with a single patient record 203, which may point to (or include) multiple studies 205 (e.g., the studies 205A, 205B, and 205C) associated with the patient. Each study may represent a medical study associated with the patient such as an imaging study (e.g., x-ray), blood test, or other medical operation.

For various reasons, there may be situation where multiple patient records 203 are inadvertently created with the same patient ID 201. When this occurs, a variety of association scenarios may result, each posing potential patient safety concerns with different severities, implications, and solutions. These scenarios are described below.

Figure 3A:
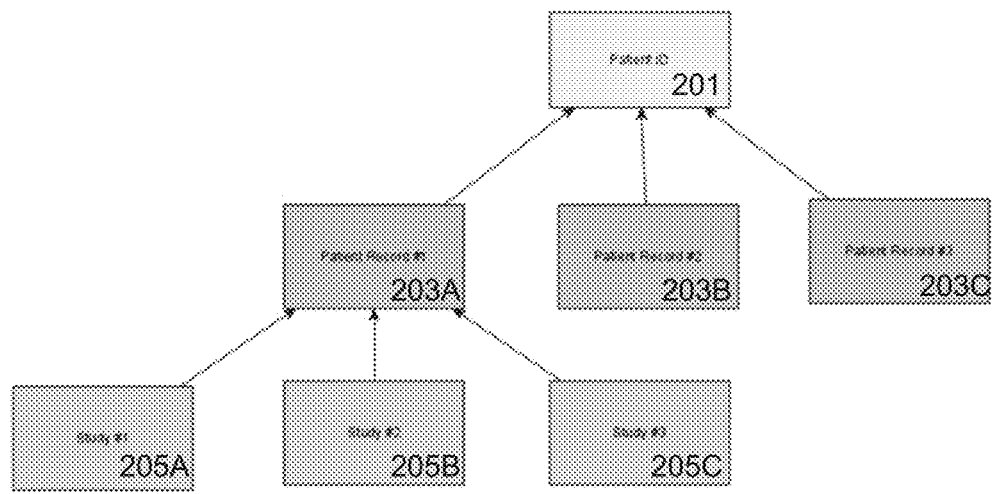
FIGS. 3A, 3B, 4, 5, and 6 are illustrations of example graphs representing duplicate medical records associated with a patient.

For example, with reference to FIG. 3A is shown an example scenario where the patient ID 201 is associated with three records 203 (e.g., the records 203A, 203B, and 203C). The record 203A points to all three studies 205 (e.g., the studies 205A, 205B, and 205C) associated with the patient. The other records 203B and 203C do not point to any studies 205.

Figure 3B:
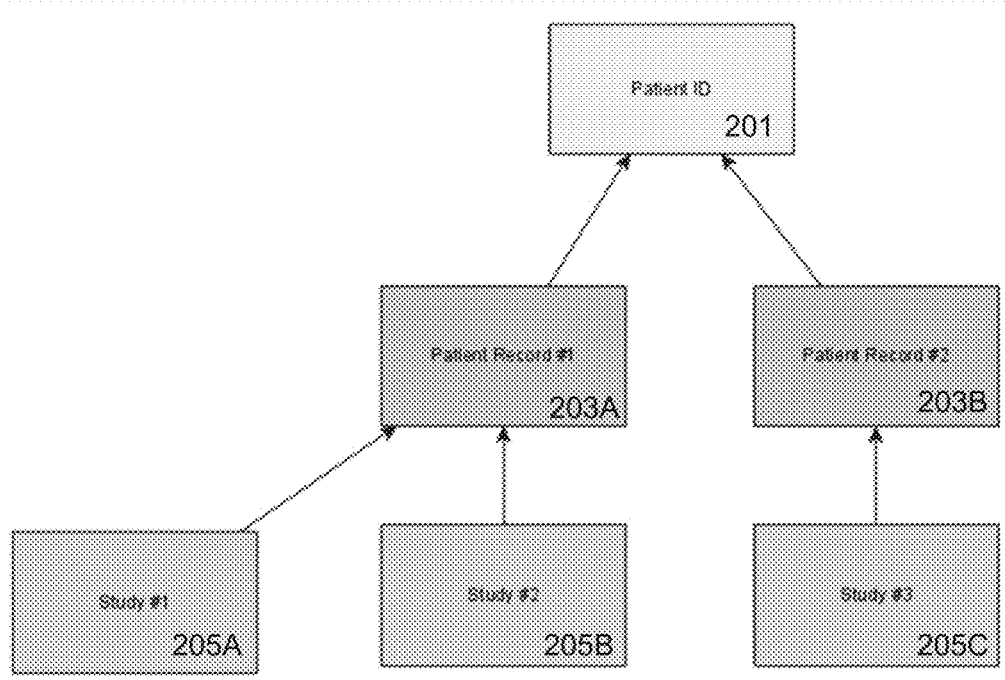

With reference to FIG. 3B is shown a scenario where the patient ID 201 is associated with the two records 203 (e.g., the records 203A and 203B). The record 203A points to two studies 205 (e.g., the studies 205A and 205B) associated with the patient. The record 203B points to one study 205 (e.g., the study 205C) associated with the patient. Neither record 203 points to all of the studies 205.

Figure 4:
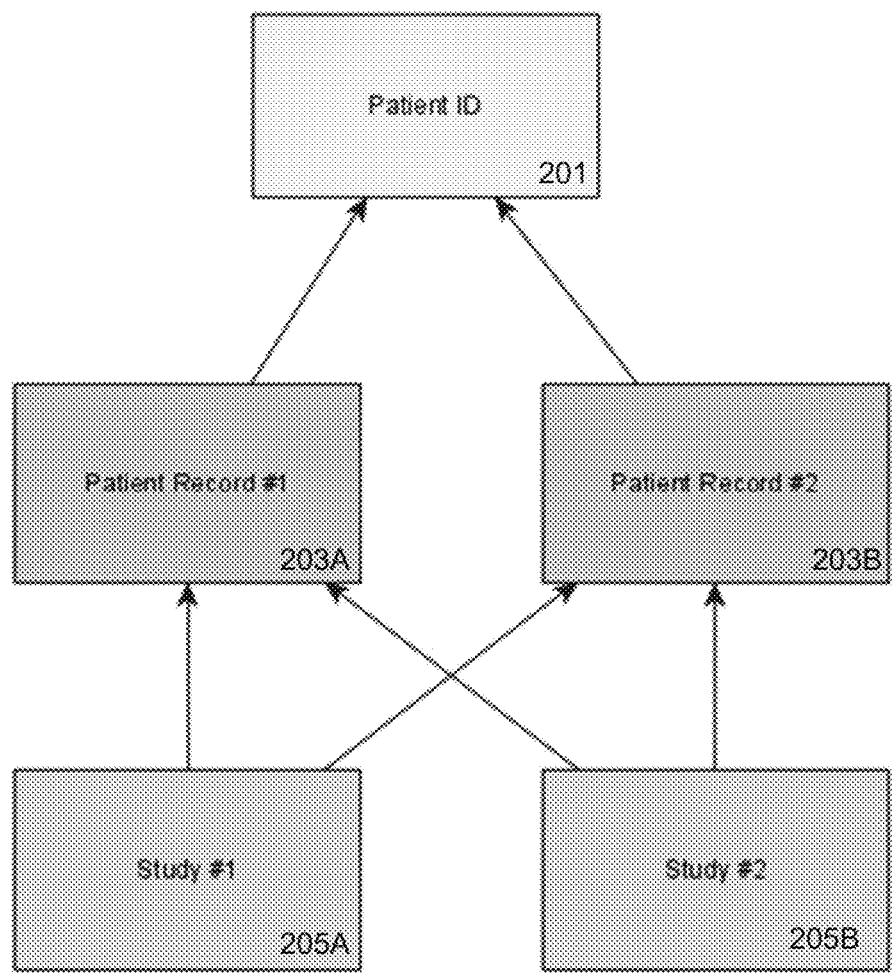

With reference to FIG. 4 is shown a scenario where the patient ID 201 is associated with the two records 203 (e.g., the records 203A and 203B). The records 203A and 203B both point to the same studies 205 (e.g., the studies 205A and 205B).

Figure 5:
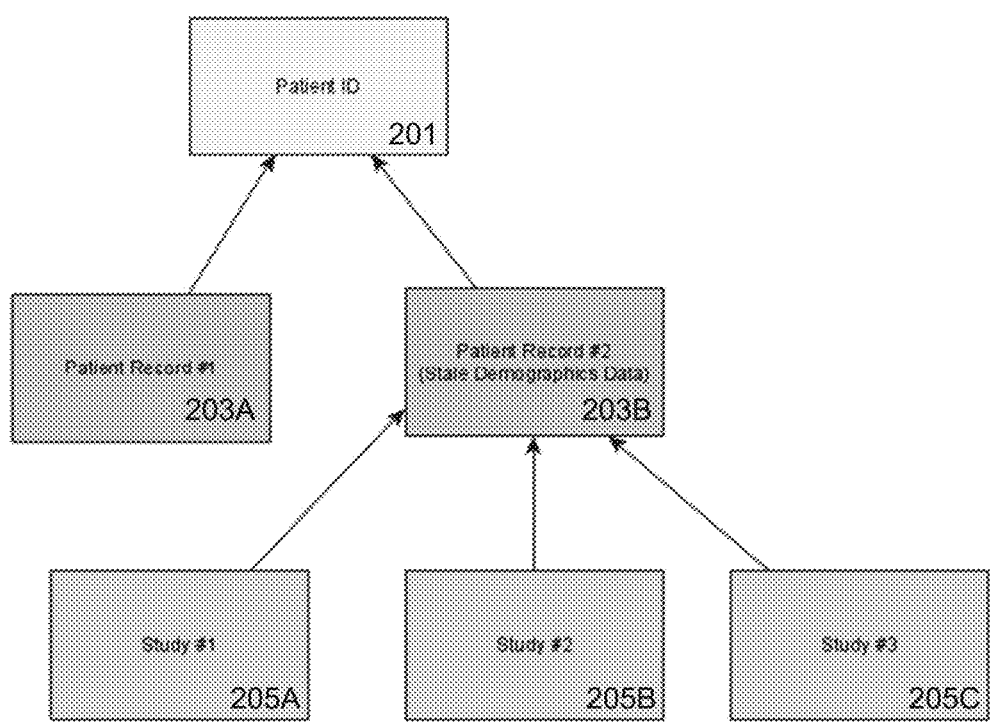

With reference to FIG. 5 is shown another scenario where the patient ID 201 is associated with the two records 203 (e.g., the records 203A and 203B). The record 203A includes up-to-date information about the patient but is not associated with the studies 205 (e.g., the studies 205A, 205B, and 205C). The record 203B includes stale information about the patient but is associated with all of the studies 205.

Figure 6:
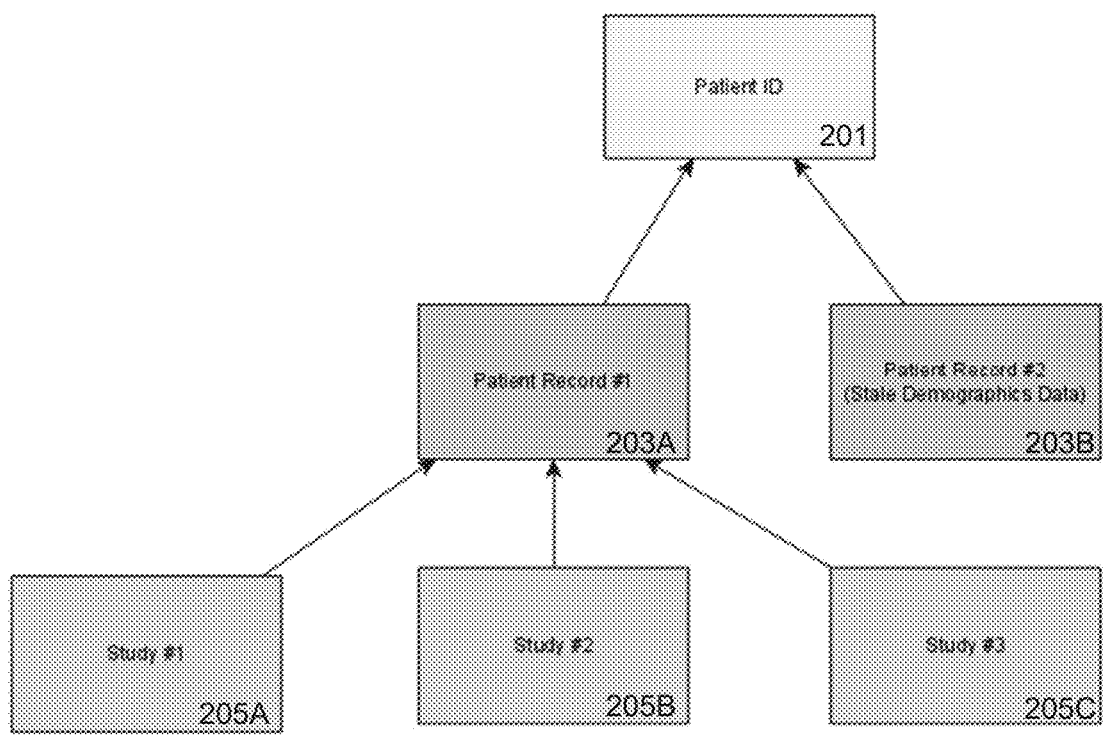

With reference to FIG. 6 is shown another scenario where the patient ID 201 is associated with the two records 203 (e.g., the records 203A and 203B). The record 203A includes up-to-date information about the patient and is associated with the studies 205 (e.g., the studies 205A, 205B, and 205C). The record 203B includes stale information about the patient and is not associated with any of the studies 205.

In order to solve the duplicate records problem noted above, the records system 120 may use a transaction file 140 to remove the duplicate records from the records database 130 in a way that provides auditing and provides a means to revert any changes made. For purposes of illustration, the duplicate record scenario illustrated with respect to FIG. 6 will be discussed.

In order to remove the duplicate records, the system 120 may use a transaction file that includes the following operations 150: duplicate patient query operation; duplicate patient filter operation; duplicate patient record update operation; duplicate patient updated record query operation; duplicate patient updated record rollback operation; and duplicate patient audit operation. Example data structures used by the operations 150 are illustrated in FIGS. 7A and 7B respectively.

With respect to the duplicate patient query operation 150, the operation 150 may not utilize an input file 155, and instead, queries data directly from the records database 130. Both row batching (only query for a certain range/number) and request parallelism may be supported.

Figure 7A:
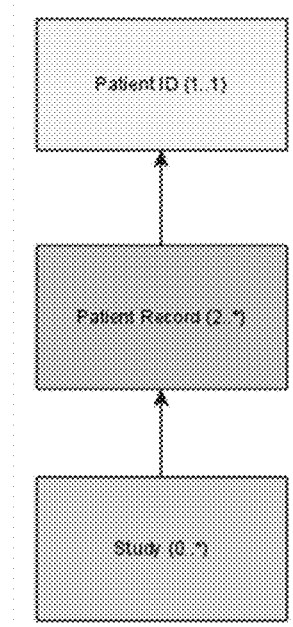
FIGS. 7A and 7B are illustrations of example data structures that may be used by an operation.
Figure 7B:
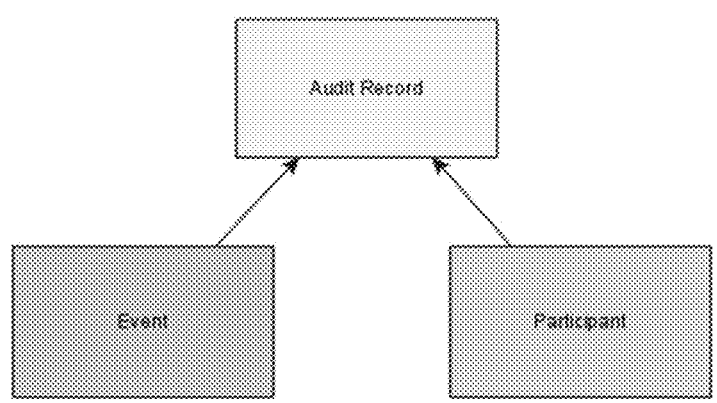

To properly populate the patient data structure of FIG. 7A, more than one query may need to be run in order to gather all the necessary data from the various database 130 tables. If even one of the queries fail, the query operation 150 for that patient item is considered failed and added to a "failure" collection of a partially populated patient data structure. If all queries succeed, the fully populated data structure is added to a "success" collection. Both collections are then serialized into a json file on disk. At the end of this operation, the resulting json output files 157 would be:

output_failure.json; and output_success.json

With respect to the duplicate patient filter operation 150, the operation 150 reads an input file 155 that contains patient data structures that suffer from the duplicate patient issue. Specifically, it will read in the output_success.json output file 157 that was generated from the duplicate patient query operation 150. As mentioned, all operations 150 within a transaction file 140 are associated to the same set of data structures, so it is easy to perform json serialization/deserialization between operations 150 because the data structure remains unchanged throughout each transaction step.

This duplicate patient filter operation 150 takes the input file 155 and performs various inclusion and exclusion checks in stages. As the problem statement involves only finding duplicate patients with 2 patient records where only 1 patient record has studies and that patient record has the latest demographics, a potential breakdown is as follows:

Stage 1:

[Exclusion] Item with >2 Patient Records; and

[Exclusion] Item with >1 Patient Record with Studies

Stage 2:

[Inclusion] Both Patient Records have same Studies associated with them

Figure 8:
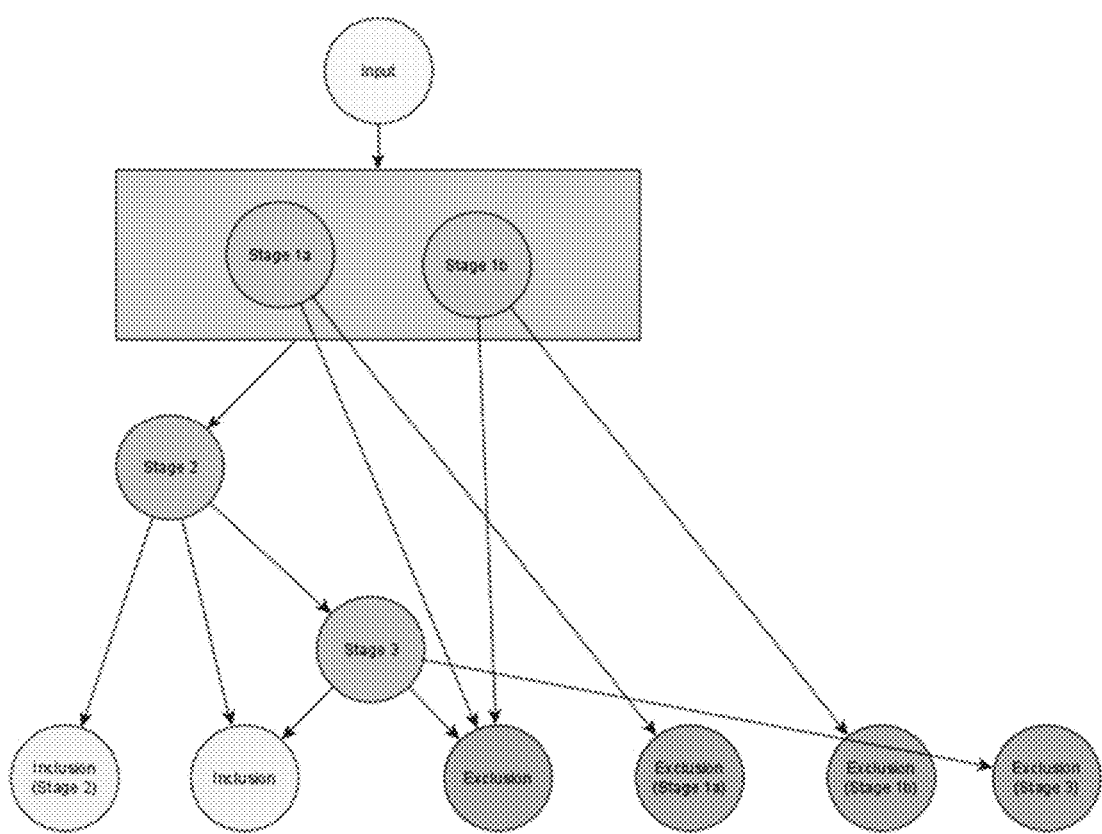
FIG. 8 is an illustration of a graph representing the stages of a duplicate patient filter operation.

Stage 3:
  [Exclusion] Item with Patient Record that has Studies, but has stale demographics data An illustration of the stages of the duplicate patient filter operation 150 is illustrated further with respect to FIG. 8. As a records goes through the various stages of processing, it will come across either exclusion (stage 1a, stage 1b, and stage 3) criteria or inclusion (stage 2) criteria.

For an exclusion criteria, if the item matches, it will no longer be considered for inclusion and is placed into one of two collections: a main exclusion collection and an exclusion collection for that stage criteria. The main exclusion collection contains the complete list of records to be excluded. The stage criteria exclusion collection only contains items that were excluded for that particular criteria.

In a particular stage, there may be more than one criteria condition applied to an item (stage 1a and stage 1b). In these situations, both criteria are applied regardless of whether the item failed the criteria check for any of the other criteria in the stage. In this way, an item may be identified to fail both criteria, and will be put into both the main exclusion collection and multiple stage criteria collections of that stage.

For an inclusion criteria, if the item matches, it will immediately be added for inclusion and placed in the main inclusion collection. As well, it may be added to the specific stage criteria collection matching the inclusion criteria.

If any error occurs during the filtering process, the item will be put in the main exclusion collection. An item that flows through the stages/criteria and doesn't match either exclusion or inclusion criteria may be considered acceptable and be included in the main inclusion collection.

In the example above, the main inclusion collection will have records that:
  Suffer from the Duplicate Patient problem (since the input is from the Duplicate Patient query);
  Have exactly two Patient Records (as it did not have>two Patient Records);
  Only have studies on one Patient Record (as it did not have>one Patient Record with Studies and it did not have exactly the same duplicated studies on both Patient Records); and
  Have the latest Patient Demographics on the Patient Records With Studies (as it did not have stale demographics data on the Patient Record with studies).

After all items have gone through the filtering processing, each of the collections are written to output json files 157 utilizing the previously described patient data structure of FIG. 7A. In this example, the resulting output json files 157 would be:
  input.json (from previous operation);
  output_inclusion.json;
  output_inclusion_stage2.json;
  output_exclusion.json;
  output_exclusion_stage1a.json;
  output_exclusion_stage1b.json; and
  output_exclusion_stage3.json By having a separate collection/output files 157 to track not just the larger inclusion/exclusion results, but also the individual inclusion/exclusion criteria, richer statistics and flexibility on subsequent filtering/processing/branching is possible.

Note that another implementation for the filter processing that is offered via the system 120 is to split each inclusion/exclusion criteria into its own filter operation 150. So instead of stages within a single filter operation 150, each stage would become its own separate filter operation 150. With this implementation, it may be possible to better re-use operations in different transactions/operation flows, as the processing is more granular.

With respect to the duplicate patient record update operation 150, the operation 150 reads the output_inclusion.json (e.g., the input file 155) from the previous filter operation 155, and for each item may perform a database 130 update to disassociate the "bad" (no studies) patient record from the Patient ID entity, which fixes the patient graph. To improve performance, update parallelism may be supported.

Items with successful updates may recorded in the "success" collection output file 157 and failed updates may be written to the "failure" collection output file 157. Additionally, during the update processing, an audit record data structure instance is created and populated with data from each item and with the update context. The audit record data structure is in the format required by the auditing subsystem, which allows for post audit processing later on.

For the auditing data, there are two collections utilized: one corresponding to audit records for failed updates and one to hold audit records for successful updates.

At the end of the operation, the following json files (i.e., output files 157) may be be generated:
  input.json (from previous operation 150);
  output_success.json;
  output_failure.json;
  output_success_auditrecords.json; and
  output_failure_auditrecords.json With respect to the duplicate patient updated record query operation 150, the operation 150 is a query operation 150 that retrieves any patients that had their records updated in the records database 130 to address the duplication patient problem. Like all query operations 150, request parallelism is supported.

As with the previously described duplicate patient query operation, the input data is retrieved from the database 130 and the resulting json files (e.g., the output files 157) after processing are:
  output_success.json; and
  output_failure.json.

With respect to the duplicate patient updated record rollback operation 150, the operation 150 takes the duplicate patient updated record query operation's output_success.json file 157 as an input and performs a database update that rolls-back the records change. As with all update operations 150, update parallelism is supported.

The resulting output files 157 after processing are:
  input.json (from previous operation);
  output_success.json;
  output_failure.json;
  output_success_auditrecords.json; and
  output_failure_auditrecords.json With respect to the duplicate patient audit operation 150, the operation 150 may take a json auditrecord file 157 from any previous operation 150 as an input. This audit record may either contain success events or failure events.

After deserializing the audit record input file back to a collection, each item is sent to an audit subsystem of the records system 120. In some embodiments, the audit subsystem may offer two (or more) different ingestion paths. For example, the audit subsystem may allow ingestion of audit records over a publish-subscribe pathway and may also allow sending audit records over a logging framework pathway. Both the publish-subscribe pathway and the logging framework pathway may be part of the audit subsystem of the records system 120.

The duplicate patient audit operation 150 may further take each item and may submit the audit details to both pathways in the audit subsystem, maintaining a success and failure collection for each type, so that statuses are properly recorded for observation purposes and/or for future resending. Audit communication parallelism is supported.

At the conclusion of this operation 150, the following json files are produced:
  input.json (from previous step);
  output_pubsub_success.json;
  output_pubsub_failure.json;
  output_log_success.json; and
  output_log_failurejson With respect to the duplicate patient obfuscation operation 150, this operation 150 may obfuscate output files 157. This operation 150 may be helpful when wanting to obfuscate existing data that previously had no or weaker obfuscation applied, or to deobfuscate existing data that was previously encrypted. To properly perform the operation 150, the following rules may apply:
  Source=target obfuscation will throw an error;
  If target obfuscation is "none", the source obfuscation must be "encrypt";
  If target obfuscation is "encrypt", the source obfuscation must be "none"; and
  If target obfuscation is "anonymize", the source obfuscation must be "none" or "encrypt"

Returning to FIG. 1, as described above, the particular operation 150 that are executed by the records system 120 is defined by the transaction file 140. The transaction file 140 may indicate the operations 150 to use, the order of operations 150, and any parameters that are required to run the operations 150. Example transaction files 140 for the duplicate patient transaction and rollback transaction are illustrated below.

Duplicate Patient Transaction File 140:

```
{
"Name": "FixDuplicatePatients",
"Steps": [
{
   "Operation": "dupepat_query",
"Parameters": {
   "MrnPatternMatch": "0%"
},
"Active": true
},
{
Operation": "dupepat_filter",
"InputFilePath":
"\u003C\u003CTRANSACTION_FOLDER\u003E\u003E\\##-
dupepat_query\\output_success.json",
"Active": true
},
{
"Operation": "dupepat_patrec_update",
"InputFilePath":
"\u003C\u003CTRANSACTION_FOLDER\u003E\u003E\\##-
dupepat_filter\\output_inclusion.json",
"Parameters": {
"DuplicatePatientUpdatedMrnPrefix": "d_"
},
"Active": true
},
{
"Operation": "dupepat_updatedpatrec_audit",
"InputFilePath":
"\u003C\u003CTRANSACTION_FOLDER\u003E\u003E\\##-
dupepat_patrec_update\\output_success_auditentries.json",
"Parameters": {
"PerformPubSubAudit": "true",
"PerformLogAudit": "true
```

```
},
"Active": true
},
{
"Operation": "dupepat_updatedpatrec_audit",
"InputFilePath":
"\u003C\u003CTRANSACTION_FOLDER\u003E\u003E\\##-
dupepat_patrec_update\\output_failure_auditentries.json",
"Parameters": {
"PerformPubSubAudit": "true",
"PerformLogAudit": "true"
},
"Active": true
}
]
}
```

Rollback Transaction File 140:

```
{
"Name": "RollbackDuplicatePatientsUpdates",
"Steps": [
{
"Operation": "dupepat_updatedpatrec_query",
"Parameters": {
"DuplicatePatientUpdatedMrnPrefix": "d_"
},
"Active": true
},
{
"Operation": "dupepat_updatedpatrecrollback_update",
"InputFilePath":
"\u003C\u003CTRANSACTION_FOLDER\u003E\u003E\\##-
dupepat_updatedpatrec_query\\output_success.json",
"Parameters": {
"DuplicatePatientUpdatedMrnPrefix": "d_"
},
"Active": true
},
{
"Operation": "dupepat_updatedpatrec_audit",
"InputFilePath":
"\u003C\u003CTRANSACTION_FOLDER\u003E\u003E\\##-
dupepat_updatedpatrecrollback_update\\output_success_auditentries.json",
"Parameters": {
"PerformPubSubAudit": "true",
"PerformLogAudit": "true"
},
"Active": true
},
{
"Operation": "dupepat_updatedpatrec_audit",
"InputFilePath":
"\u003C\u003CTRANSACTION_FOLDER\u003E\u003E\\##-
dupepat_updatedpatrecrollback_update\\output_failure_auditentries.json",
"Parameters": {
"PerformPubSubAudit": "true",
"PerformLogAudit": "true"
},
"Active": true
}
]
}
```

In general, with respect to the transaction file 140, each operation 150 within the file 140 can be enabled or disabled which may allow for the flexible chaining or operations 150. Furthermore, the input file path ("inputFilePath" in the above example transaction files 140) may take one of two forms, an absolute path or a relative path. The absolute path may point to an exact folder/file from which to obtain the input data (e.g., input file 155). This option is useful for using a previous transaction's (could have been run a little earlier or even days earlier) output file 157 as the input for the operation 150.

The relative path may be relative to the "nearest" previous operation 150 (matches the operation sub-folder and filename structure) within the same transaction instance. This option utilizes logic within the records system 120 to intelligently determine what folder/file to get the input data (e.g., input file 155) from. The input file 155 may be one that was generated in a previous step (closest, earlier operation 150 execution ordinal) within the same transaction instance that this particular operation 150 instance is running. This option is useful when chaining operations 150 within the same transaction instance that depend on each other's outputs.

Figure 9:
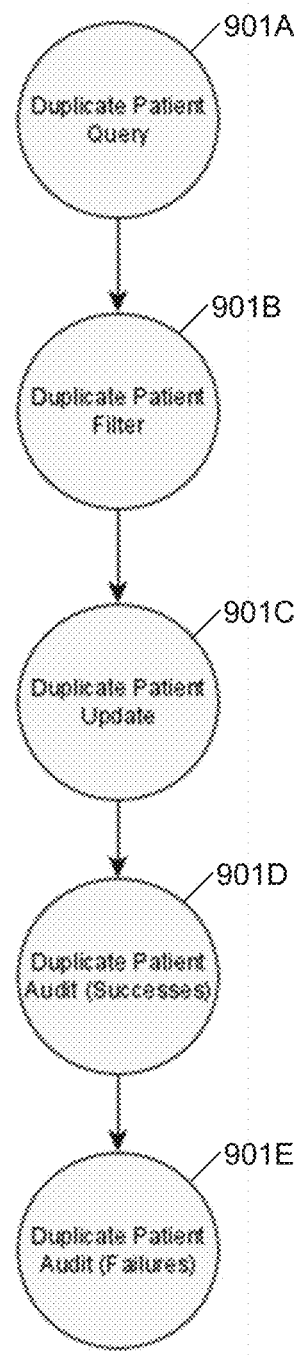
FIG. 9 is an illustration of a graph representing the order of operations performed in a transaction file.

In some embodiments, the records system 120 may further support operation 150 branching in the transaction file 140. Continuing to FIG. 9 is an illustration of a graph representing the operations in the duplicate patient transaction File 140 described above. As shown, each node n 901 (e.g., the nodes 901A-901E) represents an operation 150 performed in the order defined by the graph.

The use of a single data structure format for all operations 150 makes it easy to create new transaction/operation branch points off of existing operations 150 result outputs. For example, if the items identified by the filter operation's stage 2 "Items with >1 patient record that has studies" exclusion criteria need to be addressed, the output file generated from this stage could be used as the input for a new operation 150 that starts a new type of transaction.

Figure 10:
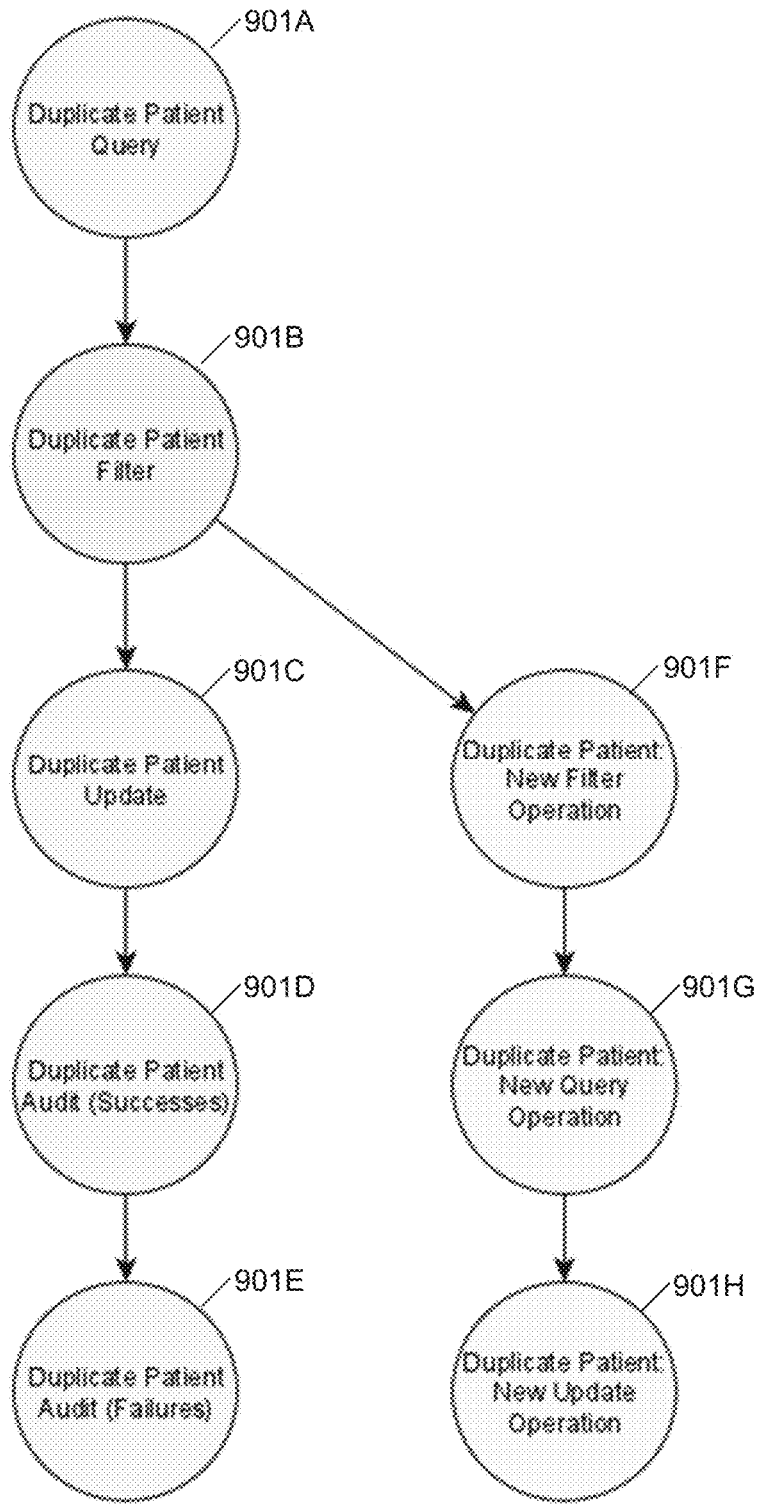
FIG. 10 is an illustration of a graph representing the order of operations performed in a transaction file including branching operations.

For example, continuing to FIG. 10 is an illustration of a graph representing the operations of the duplicate patient transaction file 140 with a branch at the node 901B. The branch operations 150 include the nodes 901F, 901G, and 901H.

In addition, in some embodiments, the system 120 may allow for the creation of new operation 150 types that can potentially work within different parts of pre-existing transactions/operations.

For example, there may be a new statistics generation operation 150 that takes operation data structure output files 157 as inputs, does processing to collate and derive statistics from the data, and outputs the data to an output file 157 file and/or to another subsystem. Assuming that the output data (e.g., the output file 157) from previous operations has the necessary info required by the new statistics operation 150, it may be possible to introduce the operation 150 as a branch point at whatever transaction step requires it.

Figure 11:
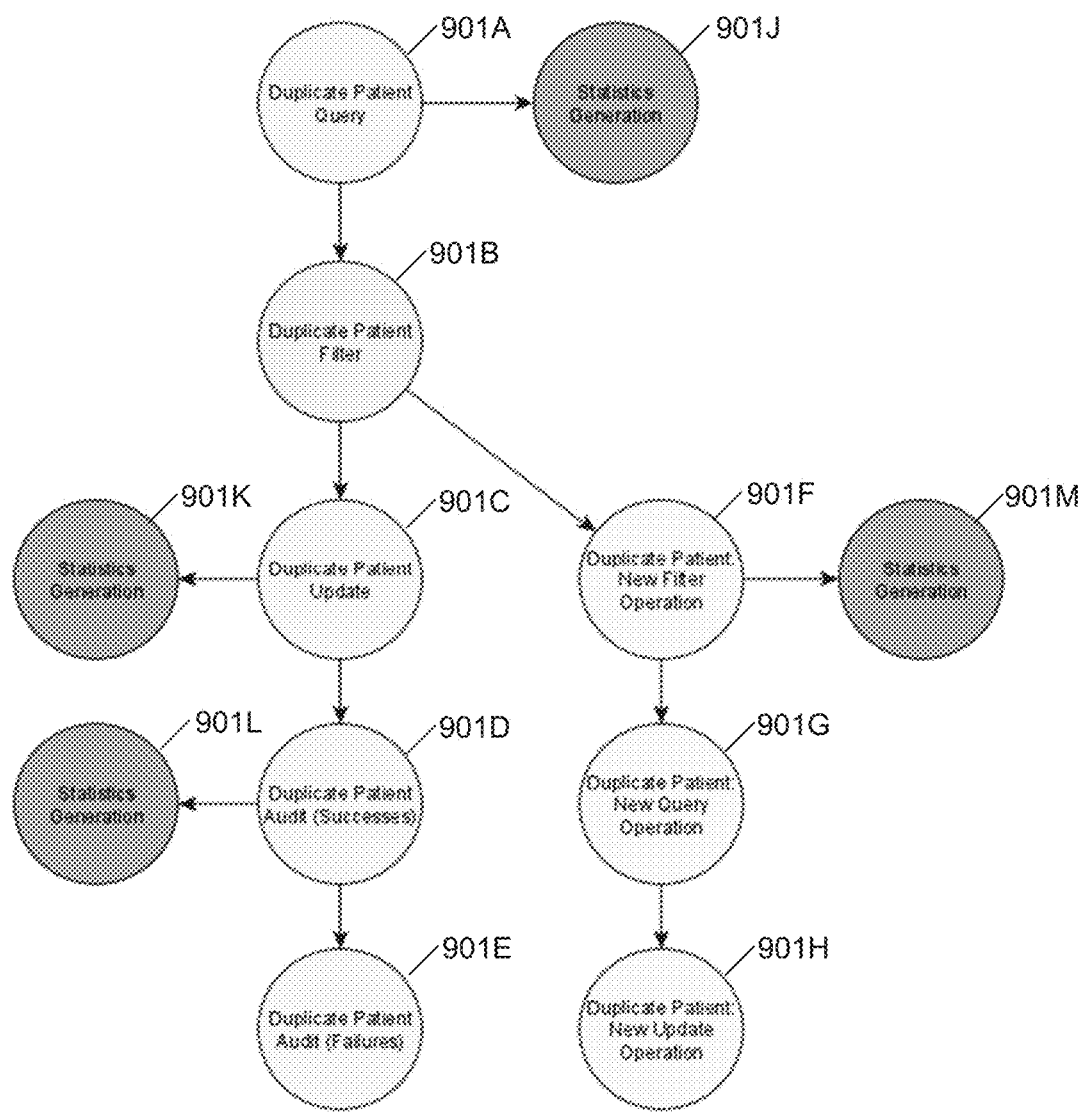
FIG. 11 is an illustration of a graph representing the order of operations performed in a transaction file including branching operations such as statistics generation operations.

Continuing the above example, FIG. 11 is an illustration of a graph of the the operations of the duplicate patient transaction file 140 including the branching operations 150 and the statistics generation operations 150. As shown, the nodes 901J, 901K, 901M, and 901N represent the statistics generation operations 150 in the graph of the duplicate patient transaction file 140.

In some embodiments, in order to protect sensitive or private information in output files 157, the system 120 may further support the use of obfuscation flags in the operations 150. An obfuscation flag set for a property in an operation 150 may indicate the the value of the property should be obfuscated when output in an output file 157. Conversely, if the obfuscation flag is not set for a property, then the value of the property will be shown in the output file 157.

An example output file 157 with no obfuscation is reproduced below:

```
{
  "StudyCount": 1,
  "ObfuscationMethod": 0,
  "Timestamp": "2021-04-11T08:31:47.1759376Z",
  "OperationComment": "Duplicate Patients: Same PatID For Multiple PatRecs (Update PatRec Success)",
  "Count": 1,
  "Results": [
    {
      "PatIDKey": "PatID@@w77PqCSbN0u1HHVZF0RNSw:0030f90dcde34392af4c3a984423f4de@@1111",
      "AssociatedPatRecKey": "PatRec@@aa4ebb39cd0f4773a2beb87a03a51607@@1111",
      "CTime": 1591650699,
      "MTime": null,
      "PatRecCount": 2,
      "StudyCount": 1,
      "PatRecs": [
        {
          "OperationComment": "UPDATED",
          "PatRecKey": "PatRec@@2be92c5b64354e6fb5628d541ed31260@@1111",
          "Issuer": "w77PqCSbN0u1HHVZF0RNSw",
          "MRN": "d_0030f90dcde34392af4c3a984423f4de",
          "AssociatedPatIDKey": null,
          "CTime": 1571339627,
          "MTime": null,
          "InactiveTime": 1618129907,
          "StudyCount": 0,
          "Studies": [ ]
        },
        {
          "PatRecKey": "PatRec@@aa4ebb39cd0f4773a2beb87a03a51607@@1111",
          "Issuer": "w77PqCSbN0u1HHVZF0RNSw",
          "MRN": "0030f90dcde34392af4c3a984423f4de",
          "AssociatedPatIDKey": "PatID@@w77PqCSbN0u1HHVZF0RNSw:0030f90dcde34392af4c3a984423f4de@@1111",
          "CTime": 1591650699,
          "MTime": null,
          "InactiveTime": 0,
          "StudyCount": 1,
          "Studies": [
```

```
            {
                "StudyKey":
"Study@@1.2.840.113711.8062020091138991.954210693661915@@1111",
                "Date": "20190515",
                "Modalities": [
                    "CT"
                ]
            }
          ]
        }
      ]
    }
  ]
}
```

An example of an output file 157 generated for an audit operation is as follows:

```
{
  "ObfuscationMethod": 0,
  "Timestamp": "2021-04-11T08:31:47.1760899Z",
  "OperationComment": "Duplicate Patients: Same PatID For Multiple
PatRecs (Update PatRec Success Audit Entries)",
  "Count": 1,
  "Results": [
    {
      "msg": {
        "_type": "AuditEvent",
        "event": {
          "type": {
            "code": "110110",
            "system":
"http://dicom.nema.org/resources/ontology/DCM",
            "display": "Patient Record"
          },
          "action": "M",
          "subtype": {
            "code": "4000",
            "system": "IINEventSubtype",
            "display": "DuplicatePatient"
          },
          "datetime": "2021-04-11T01:31:47.294901-07:00",
          "unixTimeSec": 1618129907,
          "outcome": "0",
          "outcomeDescription": "Duplicate Patient: Patient Record
Update",
          "businessEvent": "PatientUpdated"
        },
        "agent": [
          {
            "role": {
              "coding": [
                {
                  "code": "110153",
                  "system":
"http://dicom.nema.org/resources/ontology/DCM",
                  "display": "Source Role ID"
                }
              ],
              "text": "Source"
            },
            "userId": {
              "use": "official",
              "value": "CORPORATE\\elwong"
            },
            "requestor": true,
            "network": {
              "type": "2",
              "address": "192.168.0.104"
            }
          }
        ],
        "source": {
          "Identifier": {
            "use": "normal",
            "value": "Ipi.Utilities.CBDataCleanupTool"
          },
          "type": {
            "code": "2",
            "system":
"http://hl7.org/fhir/ValueSet/audit-source-type",
            "display": "Data Interface"
          }
        },
        "entity": [
          {
            "identifier": {
              "use": "official",
              "type": {
                "code": "MR",
                "system":
"http://terminology.hl7.org/CodeSystem/v2-0203",
                "display": "Medical Record Number"
              },
              "system": "w77PqCSbN0u1HHVZF0RNSw",
              "value": "0030f90dcde34392af4c3a984423f4de"
            },
            "type": {
              "code": "1",
              "system": "http://hl7.org/fhir/object-type",
              "display": "Person"
            },
            "role": {
              "code": "1",
              "system": "http://hl7.org/fhir/object-role",
              "display": "Patient"
            },
            "detail": [
              {
                "type": "PatRecGUID",
                "value":
"PatRec@@2be92c5b64354e6fb5628d541ed31260@@1111"
              },
              {
                "type": "InactiveTime",
                "value": 1618129907
              },
              {
                "type": "AdjustedMRN",
                "value":
"d_0030f90dcde34392af4c3a984423f4de"
              }
            ]
          }
        ]
      },
      "tenantId": null,
      "bizTxId": null,
      "bizProcId": null,
      "parentReqId": null,
      "reqId": null,
      "logType": "Audit",
      "logger": "Audit.Ipi.Business.Audit",
      "namespace": "Ipi.Utilities.CBDataCleanupTool",
      "objectProcessingFlag": null,
      "storageFlag": null,
```

-continued

```
    "version": null
  }
 }
]
}
```

In some embodiments, the records system 120 may further support the encryption of values in the output files 157 generated by operations 150. That the value of a property should be encrypted in an output file 157 may be specified using a flag similar to the obfuscation flag described above. If an output file 157 that uses encryption for one or more properties is used as an input into another operation 150, the encrypted data properties are decrypted so that the operation 150 can access and act against the original data. This allows for the protection of the operation data in the entire transaction flow (i.e. on disk and afterwards in the event the output file 157 is copied/moved), yet allows the output file 157 to be converted back to the original content with no obfuscation.

Figure 12:
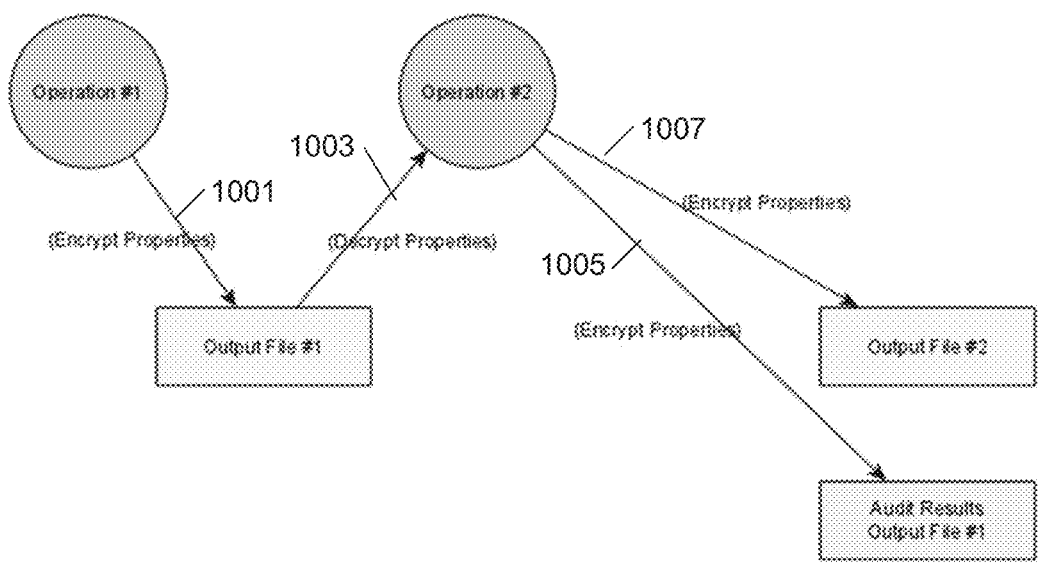
FIG. 12 is an illustration of a graph of an example transaction including encryption.

For example, FIG. 12 is an illustration of a graph of an example transaction including encryption. As shown, at 1001 the operation #1 outputs the output file #1 that includes encrypted properties. At 1003, the encrypted properties are decrypted before the operation #2 receives the output file #1 as an input. Finally, at 1005 and 1007, the operation #2 generates an output file #2 and an audit results output file #1 that both include encrypted properties.

An example output file 157 that includes encrypted properties is as follows:

```
{
  "StudyCount": 1,
  "ObfuscationMethod": 1,
  "Timestamp": "2021-04-11T08:00:34.3031968Z",
  "OperationComment": "Duplicate Patients: Same PatID For Multiple PatRecs (Update PatRec Success)",
  "Count": 1,
  "Results": [
    {
      "PatIDKey":
"MIIB+gYJKoZIhvcNAQcDoIIB6zCCAecCAQIxggFcoolBWAIBBDCCARoEgcABAAAAS0RTSwIAAABnAQAAGAAAABUAAABAVu6Yj
ETQQjxGVrfslrXgIAAAADYAAAA2AAAA3NoPVIAn8n2n0ERnD1KrDErXAV0THKmERyZJNT21sOdjAG8AcgBwAG8AcgBhAHQAZ
QAuAGgAZQBhAGwAdABoAGMAYQByAGUAaQB0AC4AbgBIAHQAAABjAG8AcgBwAG8AcgBhAHQAZQAuAGgAZQBhAGwAdA
BoAGMAYQByAGUAaQB0AC4AbgBIAHQAAAAwVQYJKwYBBAGCN0oBMEgGCisGAQQBgjdKAQEwOjA4MDYMA1NJRAwvUy0x
LTUtMjEtMTE1MDQwMjM2My0yNzMwNzl2OTkzLTE3Nzg0MTgzNDEtMTQzNDIwCwYJYIZIAWUDBAEtBCjsPnlUzPQZifX9VJXg
gydvYkb1RIWEkxTcQoHEtZXWr5aqrAVcImBMIGBBgkqhkiG9w0BBwEwHgYJYIZIAWUDBAEuMBEEDGOUmOafGFY6uXfQSAIB
EIBUkNpl32XRm7CC2iNBr18xhMARv6mR8TVw5kX1jPwaCaAXzD4bAB64wcCvx797bpM8kOaQWvnhYJf2YyRmo3LW6pvYO1f
uFyZF03jlybXrUdeHWveM",
      "AssociatedPatRecKey": "PatRec@@aa4ebb39cd0f4773a2beb87a03a51607@@1111",
      "CTime": 1591650699,
      "MTime": null,
      "PatRecCount": 2,
      "StudyCount": 1,
      "PatRecs": [
        {
          "OperationComment": "UPDATED",
          "PatRecKey":
"PatRec@@2be92c5b64354e6fb5628d541ed31260@@1111",
          "Issuer":
"MIIBywYJKoZIhvcNAQcDoIIBvDCCAbgCAQIxggFcoolBWAIBBDCCARoEgcABAAAAS0RTSwIAAABnAQAAGAAAABUAAABAVu6
YjETQQjxGVrfslrXgIAAAADYAAAA2AAAAwXgFLRgJBWtsvKcSzLZs/e15agiZHIMTOSDS8/g50uVjAG8AcgBwAG8AcgBhAHQAZQ
AuAGgAZQBhAGwAdABoAGMAYQByAGUAaQB0AC4AbgBIAHQAAABjAG8AcgBwAG8AcgBhAHQAZQAuAGgAZQBhAGwAdAB
oAGMAYQByAGUAaQB0AC4AbgBIAHQAAAAwVQYJKwYBBAGCN0oBMEgGCisGAQQBgjdKAQEwOjA4MDYMA1NJRAwvUy0xL
TUtMjEtMTE1MDQwMjM2My0yNzMwNzl2OTkzLTE3Nzg0MTgzNDEtMTQzNDIwCwYJYIZIAWUDBAEtBChP0J8kczxOQ4e+uxY
2rK+VJnP6YQiu00TCZrzluCaH5SsUX82q/LbXMFMGCSqGSIb3DQEHATAeBglghkgBZQMEAS4wEQQMDJ7pssjRCM+pW6MLAgE
QgCY4Pg1ijlvq/YjfRuyB4SeiOOpCZQvUZR14g+SOXZvQ4pS0F1Vk7Q==",
          "MRN":
"MIIB1wYJKoZIhvcNAQcDoIIByDCCAcQCAQIxggFcoolBWAIBBDCCARoEgcABAAAAS0RTSwIAAABnAQAAGAAAABUAAABAVu6
YjETQQjxGVrfslrXgIAAAADYAAAA2AAAAEX76FieiGbKCrwlJEoWVfvYVZ/1j/hgKcw7gyV+Tn+xjAG8AcgBwAG8AcgBhAHQAZQA
uAGgAZQBhAGwAdABoAGMAYQByAGUAaQB0AC4AbgBIAHQAAABjAG8AcgBwAG8AcgBhAHQAZQAuAGgAZQBhAGwAdABo
AGMAYQByAGUAaQB0AC4AbgBIAHQAAAAwVQYJKwYBBAGCN0oBMEgGCisGAQQBgjdKAQEwOjA4MDYMA1NJRAwvUy0xLT
UtMjEtMTE1MDQwMjM2My0yNzMwNzl2OTkzLTE3Nzg0MTgzNDEtMTQzNDIwCwYJYIZIAWUDBAEtBCg/evre5XBiz4rjNBI/7R
Zz8D1uwWW/MNRYoWaSHHYVCfvHzZ7yOLZsMF8GCSqGSIb3DQEHATAeBglghkgBZQMEAS4wEQQMDaWgyKOflPCSVmbaAg
EQgDK2RE8FVWyeGwa5eNNPh4MSAvRIUAZFg51FTAVXEB0Je+FmfJ9081D6Y0nzGWjUXYrDGg==",
          "AssociatedPatIDKey": null,
          "CTime": 1571339627,
          "MTime": null,
          "InactiveTime": 1618128034,
          "StudyCount": 0,
          "Studies": [ ]
        },
        {
          "PatRecKey":
"PatRec@@aa4ebb39cd0f4773a2beb87a03a51607@@1111",
          "Issuer":
"MIIBywYJKoZIhvcNAQcDoIIBvDCCAbgCAQIxggFcoolBWAIBBDCCARoEgcABAAAAS0RTSwIAAABnAQAAGAAAABUAAABAVu6
YjETQQjxGVrfslrXgIAAAADYAAAA2AAAAdL2F+L54m1TE2Gwi9KeOW4yjaQ6i0hieZwsfXfKfAZxjAG8AcgBwAG8AcgBhAHQAZQ
AuAGgAZQBhAGwAdABoAGMAYQByAGUAaQB0AC4AbgBIAHQAAABjAG8AcgBwAG8AcgBhAHQAZQAuAGgAZQBhAGwAdAB
oAGMAYQByAGUAaQB0AC4AbgBIAHQAAAAwVQYJKwYBBAGCN0oBMEgGCisGAQQBgjdKAQEwOjA4MDYMA1NJRAwvUy0xL
TUtMjEtMTE1MDQwMjM2My0yNzMwNzl2OTkzLTE3Nzg0MTgzNDEtMTQzNDIwCwYJYIZIAWUDBAEtBCiKD2SAzdQyUxWxAb
9sqP9QIW94rBWKKEJqiXqDkvSjGQu7+kFmjbhoMFMGCSqGSIb3DQEHATAeBglghkgBZQMEAS4wEQQMKAIuOXCb3LMvBMV
WAgEQgCa26NAnywoa7MhkJZwJUzFWbWG6ZGSWsBs651tUqLEQoip8heRrKQ==",
```

```
      "MRN":
"MIIB1QYJKoZlhvcNAQcDollBxjCCAclCAQIxggFcoolBWAIBBDCCARoEgcABAAAAS0RTSwlAAABnAQAAGAAAABUAAABAVu6Yj
ETQQjxGVrfslrXgIAAAADYAAAA2AAAAM6MDaT/jTrRovwSkpJchWnJvMcScKxDvMZkH1xkX/xpjAG8AcgBwAG8AcgBhAHQAZQ
AuAGgAZQBhAGwAdABoAGMAYQByAGUAaQB0AC4AbgBIAHQAAABjAG8AcgBwAG8AcgBhAHQAZQAuAGgAZQBhAGwAdAB
oAGMAYQByAGUAaQB0AC4AbgBIAHQAAAAwvVQYJKwYBBAGCN0oBMEgGCisGAQQBgjdKAQEwOjA4MDYMA1NJRAwvUy0xL
TUtMjEtMTE1MDQwMjM2My0yNzMwNzl2OTkzLTE3Nzg0MTgzNDEtMTQzNDIwCwYJYIZIAWUDBAEtBCgCksFSp7ClfvdmPrW
HWYCS33RaEGGIP8yULtR8uZlfQtt3DtALyFcQMF0GCSqGSIb3DQEHATAeBglghkgBZQMEAS4wEQQMs1ElaX24lvE34F2hAgEQg
DCyuWsq3RFH3XZT92U7so6SY4V33oX1E3XlyO8WqG+UErc8dpjWQZh2H/hygWyakwk=",
      "AssociatedPatIDKey":
"MIIB+gYJKoZlhvcNAQcDollB6zCCAecCAQIxggFcoolBWAIBBDCCARoEgcABAAAAS0RTSwlAAABnAQAAGAAAABUAAABAVu6Yj
ETQQjxGVrfslrXgIAAAADYAAAA2AAAAZEB+dtAd0TKwOmb0+MPyd/0lz6kMhyK5uxBfYsWOBjxjAG8AcgBwAG8AcgBhAHQAZ
QAuAGgAZQBhAGwAdABoAGMAYQByAGUAaQB0AC4AbgBIAHQAAABjAG8AcgBwAG8AcgBhAHQAZQAuAGgAZQBhAGwAdABoAGMA
YQByAGUAaQB0AC4AbgBIAHQAAAAwvVQYJKwYBBAGCN0oBMEgGCisGAQQBgjdKAQEwOjA4MDYMA1NJRAwvUy0x
LTUtMjEtMTE1MDQwMjM2My0yNzMwNzl2OTkzLTE3Nzg0MTgzNDEtMTQzNDIwCwYJYIZIAWUDBAEtBChiyCPHDpwnKbGoQ
vs/ZI2Whs+2QeHjCV0oJvH70T+QgeIWBSM6TapjMIGBBgkqhkiG9w0BBwEwHgYJYIZIAWUDBAEuMBEEDKAtorbqcOgMpwcM
XwIBEIBUhoeq+CTAy1lePlwYswnW7uvRdHWjyhCS0Uhuh6bTpVB8lkln1xf4e/CJPNgMDhFXz3SNjYKolxL07VYOkk/g4SQqBRN
8xGpuptYqqbcd5mPv5nG6",
        "CTime": 1591650699,
        "MTime": null,
        "InactiveTime": 0,
        "StudyCount": 1,
        "Studies": [
          {
            "StudyKey":
"MIIB8QYJKoZlhvcNAQcDollB4jCCAd4CAQIxggFcoolBWAIBBDCCARoEgcABAAAAS0RTSwIAAABnAQAAGAAAABUAAABAVu6Y
jETQQjxGVrfslrXgIAAAADYAAAA2AAAAVo8VOgGmnrlMKOUni6nBbAMkR8DQ2YWzRI+iBd+63EBjAG8AcgBwAG8AcgBhAHQA
ZQAuAGgAZQBhAGwAdABoAGMAYQByAGUAaQB0AC4AbgBIAHQAAABjAG8AcgBwAG8AcgBhAHQAZQAuAGgAZQBhAGwAdAB
oAGMAYQByAGUAaQB0AC4AbgBIAHQAAAAwvVQYJKwYBBAGCN0oBMEgGCisGAQQBgjdKAQEwOjA4MDYMA1NJRAwvUy
0xLTUtMjEtMTE1MDQwMjM2My0yNzMwNzl2OTkzLTE3Nzg0MTgzNDEtMTQzNDIwCwYJYIZIAWUDBAEtBChH8JfRJuPUtk8w
qoeq0IZj2H3n2dlpna2QXslNN+SEXm+lbpm7akLwMHkGCSqGSIb3DQEHATAeBglghkgBZQMEAS4wEQQMG14+JXFZg3rl0+YH
AgEQgExrEP7KnaZdwUNBcU4gE+i5X/7Cwj6PKjJcG2vj9pBOPjv5q35slmULbVJHcgJkSI1vBP6BeBEhSOSrbjayPyDH2U90J/tbXtN
oX5Lw",
            "Date": "20190515",
            "Modalities": [
              "CT"
            ]
          }
        ]
      }
    ]
  }
]
}
```

An example audit results output file 157 corresponding to the above is as follows:

```
{
"ObfuscationMethod": 1,
"Timestamp": "2021-04-11T08:00:34.3033452Z",
"OperationComment": "Duplicate Patients: Same PatID For Multiple PatRecs (Update PatRec Success Audit
Entries)",
"Count": 1,
"Results": [
  {
    "msg": {
      "_type": "AuditEvent",
      "event": {
        "type": {
          "code": "110110",
          "system":
"http://dicom.nema.org/resources/ontology/DCM",
          "display": "Patient Record"
        },
        "action": "M",
        "subtype": {
          "code": "4000",
          "system": "IINEventSubtype",
          "display": "DuplicatePatient"
        },
        "datetime": "2021-04-11T01:00:34.991501-07:00",
        "unixTimeSec": 1618128034,
        "outcome": "0",
        "outcomeDescription": "Duplicate Patient: Patient Record Update",
        "businessEvent": "PatientUpdated"
      },
```

```
                "agent": [
                    {
                        "role": {
                            "coding": [
                                {
                                    "code": "110153",
                                    "system":
"http://dicom.nema.org/resources/ontology/DCM",
                                    "display": "Source Role ID"
                                }
                            ],
                            "text": "Source"
                        },
                        "userId": {
                            "use": "official",
                            "value": "CORPORATE\\elwong"
                        },
                        "requestor": true,
                        "network": {
                            "type": "2",
                            "address": "192.168.0.104"
                        }
                    }
                ],
                "source": {
                    "Identifier": {
                        "use": "normal",
                        "value": "Ipi.Utilities.CBDataCleanupTool"
                    },
                    "type": {
                        "code": "2",
                        "system": "http://hl7.org/fhir/ValueSet/audit-source-type",
                        "display": "Data Interface"
                    }
                },
                "entity": [
                    {
                        "identifier": {
                            "use": "official",
                            "type": {
                                "code": "MR",
                                "system": "http://terminology.hl7.org/CodeSystem/v2-0203",
                                "display": "Medical Record Number"
                            },
                            "system":
"MIIBywYJKoZlhvcNAQcDoIIBvDCCAbgCAQIxggFcoolBWAIBBDCCARoEgcABAAAAS0RTSwIAAABnAQAAGAAAABUAAABAVu6
YjETQQjxGVrfslrXgIAAAADYAAAA2AAAAD1DSSn+6jjxh3k9lrF0EH7ewJsbO+8iLU10BJB64GRIjAG8AcgBwAG8AcgBhAHQAZQA
uAGgAZQBhAGwAdABoAGMAYQByAGUAaQB0AC4AbgBIAHQAAABjAG8AcgBwAG8AcgBhAHQAZQAuAGgAZQBhAGwAdABo
AGMAYQByAGUAaQB0AC4AbgBIAHQAAAAwVQYJKwYBBAGCN0oBMEgCGCisGAQQBgjdKAQEwOjA4MDYMA1NJRAwvUy0xLT
UtMjEtMTE1MDQwMjM2My0yNzMwMwNzl2OTkzLTE3Nzg0MTgzNDEtMTQzNDIwCwYJYIZIAWUDBAEtBChm7yc3aok2plISxUVz
c4gt20/iEZm/jBBslI9xd7u6vFbhc0srygbKMFMGCSqGSIb3DQEHATAeBglghkgBZQMEAS4wEQQMhzZob/PF+F363QoLAgEQgCZ
9K3eouxCflUoDoSalhgxGFB06WzPyCpVazKwduSoxeD86ugoTtQ==",
                            "value":
"MIIB1QYJKoZlhvcNAQcDoIIBxjCCAcIcAQIxggFcoolBWAIBBDCCARoEgcABAAAAS0RTSwIAAABnAQAAGAAAABUAAABAVu6Yj
ETQQjxGVrfslrXgIAAAADYAAAA2AAAAoAoKUrNiFhidhdAPzo8QvZy2qCY2TyEguW+jS7hyCAhjAG8AcgBwAG8AcgBhAHQAZQA
uAGgAZQBhAGwAdABoAGMAYQByAGUAaQB0AC4AbgBIAHQAAABjAG8AcgBwAG8AcgBhAHQAZQAuAGgAZQBhAGwAdABo
AGMAYQByAGUAaQB0AC4AbgBIAHQAAAAwVQYJKwYBBAGCN0oBMEgCGCisGAQQBgjdKAQEwOjA4MDYMA1NJRAwvUy0xLT
UtMjEtMTE1MDQwMjM2My0yNzMwMwNzl2OTkzLTE3Nzg0MTgzNDEtMTQzNDIwCwYJYIZIAWUDBAEtBChRTwjm27T5eEHhpK+
xtitXpTzDLaZQ5hNFVNLK6Ro8LZx7xkBDIBLbMFOGCSqGSIb3DQEHATAeBglghkgBZQMEAS4wEQQMVOrsGyJcu7zVHaAtAgEQ
gDAVzvLDR1ojXNXoqWdJ7urF6NUeMmFD/7rD5VKFjaDgqp/zxL0k7jsHUcJvRX7A8o="
                        },
                        "type": {
                            "code": "1",
                            "system": "http://hl7.org/fhir/object-type",
                            "display": "Person"
                        },
                        "role": {
                            "code": "1",
                            "system": "http://hl7.org/fhir/object-role",
                            "display": "Patient"
                        },
                        "detail": [
                            {
                                "type": "PatRecGUID",
                                "value":
```

```
"PatRec@@2be92c5b64354e6fb5628d541ed31260@@1111"
            },
            {
              "type": "InactiveTime",
              "value": 1618128034
            },
            {
              "type": "AdjustedMRN",
              "value":
"MIIB1wYJKoZIhvcNAQcDoIlByDCCAcQCAQIxggFcoolBWAIBBDCCARoEgcABAAAAS0RTSwIAAABnAQAAGAAAABUAAABAVu6
YjETQQjxGVrfslrXgIAAAADYAAAA2AAAAaAzGUYcvYCvb+XPnbQODrKwrrKPy2368qfjbjfUCLKNjAG8AcgBwAG8AcgBhAHQAZQ
AuAGgAZQBhAGwAdABoAGMAYQByAGUAaQB0AC4AbgBIAHQAAABjAG8AcgBwAG8AcgBhAHQAZQAuAGgAZQBhAGwAdAB
oAGMAYQByAGUAaQB0AC4AbgBIAHQAAAAwVQYJKwYBBAGCN0oBMEgGCisGAQQBgjdKAQEwOjA4MDYMA1NJRAwvUy0xL
TUtMjEtMTE1MDQwMjM2My0yNzMwNzI2OTkzLTE3Nzg0MTgzNDEtMTQzNDIwCwYJYIZIAWUDBAEtBCibDE1Lxc+kk3g1vB9
UfsZXcN9fc8JjTC7G86ppaS4YqdvoleFdfjzrMF8GCSqGSIb3DQEHATAeBglghkgBZQMEAS4wEQQMblyPM8cNNXIRth66AgEQgD
K5fkHhZiVpB4lgQRVAYLzTZvF4QRML3LdyW53nnth/EwjXwxQTL9wKFzfSDVLbxFh1Hw=="
            }
          ]
        }
      ]
    },
    "tenantId": null,
    "bizTxId": null,
    "bizProcId": null,
    "parentReqId": null,
    "reqId": null,
    "logType": "Audit",
    "logger": "Audit.Ipi.Business.Audit",
    "namespace": "Ipi.Utilities.CBDataCleanupTool",
    "objectProcessingFlag": null,
    "storageFlag": null,
    "version": null
  }
 ]
}
```

In some embodiments, the records system 120 may further support the anonymization of values in the output files 157 generated by operations 150. The flagged properties in a data structure or output file 157 may have random anonymized values assigned to them by the records system 120. The operation, original value, and anonymized value may be stored by the records system 120 in-memory dictionaries, and occurrences of values to be anonymized may be replaced with the corresponding anonymized value in the output files 157.

Consequently, though the output file 157 anonymization is lossy (original data values cannot be recovered), the original relationships between the data properties are maintained. For example, consider the following two properties:

Issuer=ABC
MRN=1234
PatientID=ABC:1234 (form: Issuer: MRN)
After anonymization, data could be changed to:
Issuer=ANON1
MRN=7890
PatientID=ANON1:7890 (form: Issuer: MRN)

As can be seen, the PatientID anonymized value maintains the original Issuer: MRN form and the values correspond to the anonymized values of the original Issuer and MRN data properties).

An example output file 157 using anonymization is as follows:

```
{
  "StudyCount": 1,
  "ObfuscationMethod": 2,
  "Timestamp": "2021-04-11T20:10:12.8654421Z",
  "OperationComment": "Duplicate Patients: Same PatID For Multiple PatRecs (Update PatRec Success)",
  "Count": 1,
  "Results": [
    {
      "PatIDKey":
"PatID@@3ee7b9f5db22417fb109e1e45fa232d1:546babb88bff41de9087aadba00aa85f@@1111",
      "AssociatedPatRecKey": "PatRec@@aa4ebb39cd0f4773a2beb87a03a51607@@1111",
      "CTime": 1591650699,
      "MTime": null,
      "PatRecCount": 2,
      "StudyCount": 1,
      "PatRecs": [
        {
          "OperationComment": "UPDATED",
          "PatRecKey":
"PatRec@@2be92c5b64354e6fb5628d541ed31260@@1111",
          "Issuer": "3ee7b9f5db22417fb109e1e45fa232d1",
          "MRN": "d_546babb88bff41de9087aadba00aa85f",
```

```
            "Associated PatIDKey": null,
            "CTime": 1571339627,
            "MTime": null,
            "InactiveTime": 1618171812,
            "StudyCount": 0,
            "Studies": [ ]
          },
          {
            "PatRecKey":
"PatRec@@aa4ebb39cd0f4773a2beb87a03a51607@@1111",
            "Issuer": "3ee7b9f5db22417fb109e1e45fa232d1",
            "MRN": "546babb88bff41de9087aadba00aa85f",
            "AssociatedPatIDKey":
"PatID@@3ee7b9f5db22417fb109e1e45fa232d1:546babb88bff41de9087aadba00aa85f@@1111",
            "CTime": 1591650699,
            "MTime": null,
            "InactiveTime": 0,
            "StudyCount": 1,
            "Studies": [
              {
                "StudyKey":
"Study@@71c857d1a6c04a7198e0a8d64f3fa553@@1111",
                "Date": "20190515",
                "Modalities": [
                  "CT"
                ]
              }
            ]
          }
        ]
      }
    ]
  }
}
```

In some embodiments, the records system 120 may further support the redaction of values in the output files 157 generated by operations 150. In particular, properties flagged as redacted may have the value "<<REDACTED>>" set in the output file 157. This obfuscation type is lossy and the original data cannot be recovered nor are the relationships between data properties maintained.

An example output file 157 using the redaction flag is:

```
{
  "StudyCount": 1,
  "ObfuscationMethod": 3,
  "Timestamp": "2021-04-11T08:37:56.8625556Z",
  "OperationComment": "Duplicate Patients: Same PatID For Multiple
  PatRecs (Update PatRec Success)",
  "Count": 1,
  "Results": [
    {
      "PatIDKey": "«REDACTED»",
      "AssociatedPatRecKey":
      "PatRec@@aa4ebb39cd0f4773a2beb87a03a51607@@1111",
      "CTime": 1591650699,
      "MTime": null,
      "PatRecCount": 2,
      "StudyCount": 1,
      "PatRecs": [
        {
          "OperationComment": "UPDATED",
          "PatRecKey":
"PatRec@@2be92c5b64354e6fb5628d541ed31260@@1111",
          "Issuer": "«REDACTED»",
          "MRN": "«REDACTED»",
          "AssociatedPatIDKey": null,
          "CTime": 1571339627,
          "MTime": null,
          "InactiveTime": 1618130276,
          "StudyCount": 0,
          "Studies": [ ]
        },
        {
          "PatRecKey":
"PatRec@@aa4ebb39cd0f4773a2beb87a03a51607@@1111",
          "Issuer": "«REDACTED»",
          "MRN": "«REDACTED»",
          "AssociatedPatIDKey": "«REDACTED»",
          "CTime": 1591650699,
          "MTime": null,
          "InactiveTime": 0,
          "StudyCount": 1,
          "Studies": [
            {
              "StudyKey": "«REDACTED»",
              "Date": "20190515",
              "Modalities": [
                "CT"
              ]
            }
          ]
        }
      ]
    }
  ]
}
```

In some embodiments, another problem associated with records, specifically medical records, that may be solved by the system 120 is known as bad sequence data. For medical studies, sequence data may describe information about the images in the studies such as image offsets. Generally, the presence of sequence data may make the viewing of the images in the studies faster because the image viewer does not have to do on-the-fly sequencing for the images.

Figure 13:
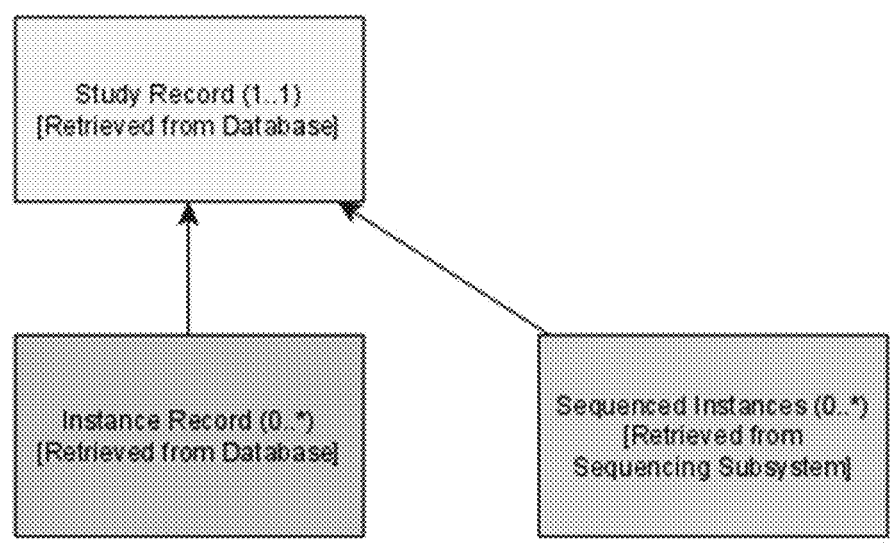
FIG. 13 is an illustration of an example data structure that may be used by an operation.
Figure 14:
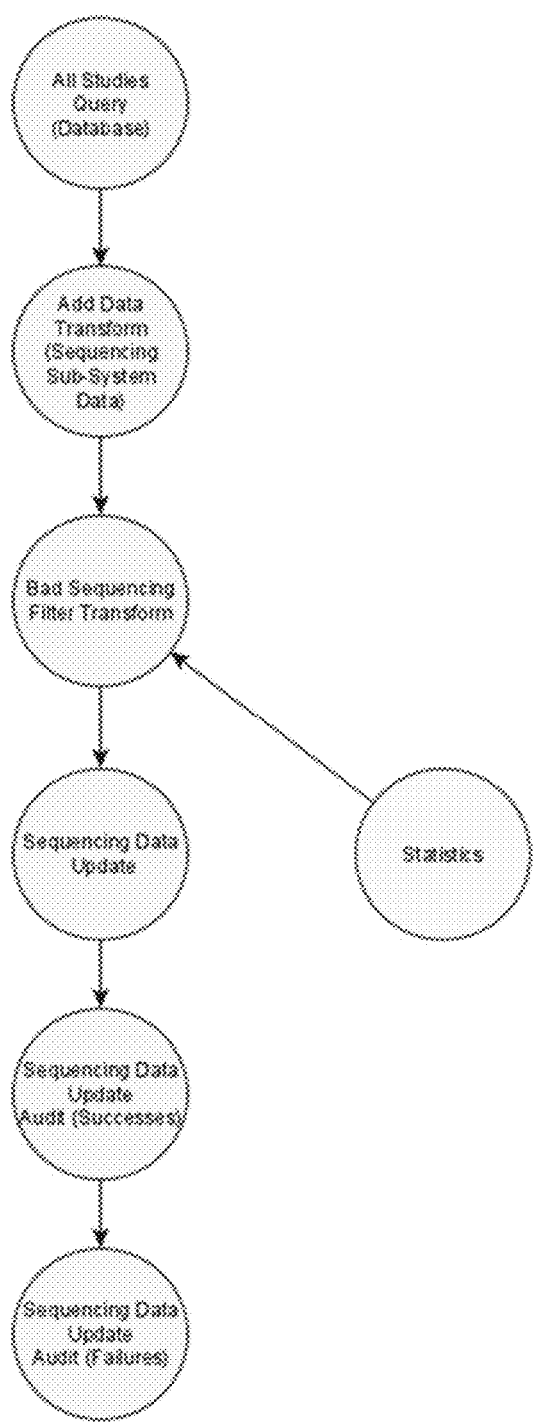
FIG. 14 is an illustration of an example sequence of operations that may be used to correct sequence data for studies in the records database.
Figure 15:
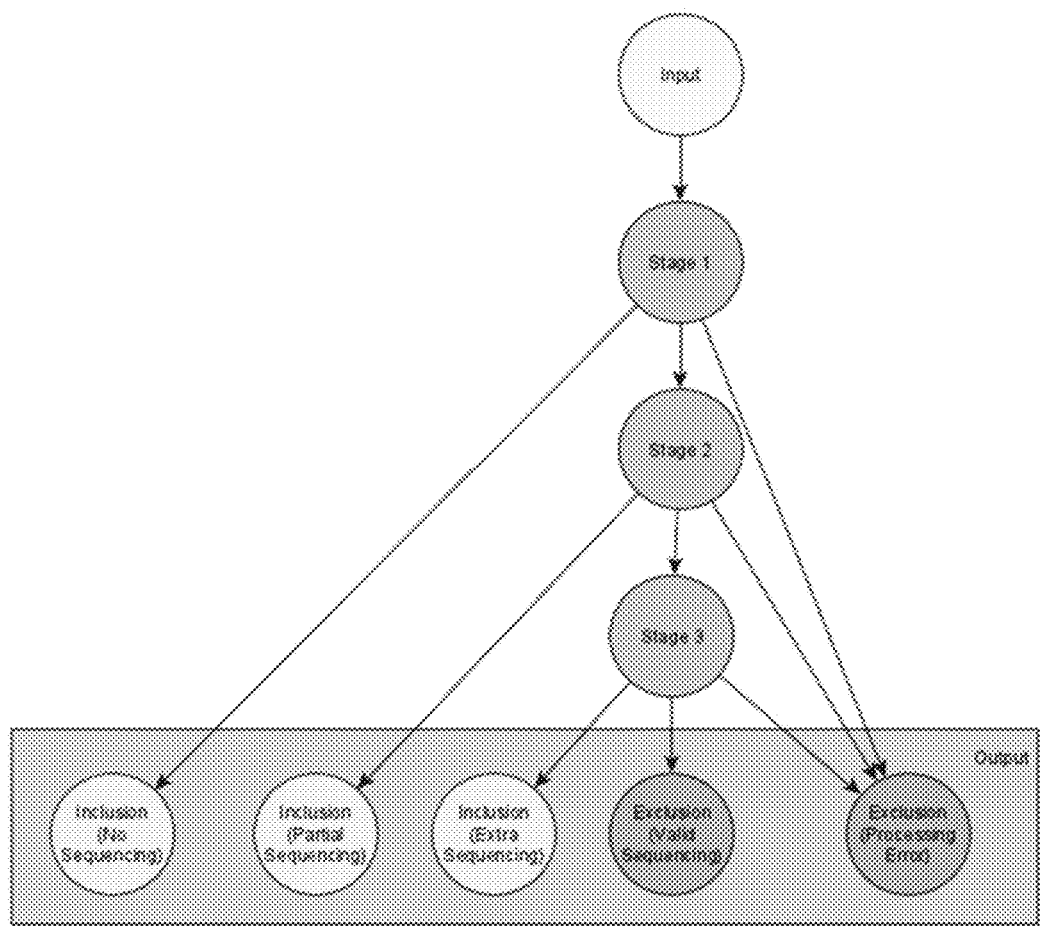
FIG. 15 is an illustration of the stages of a filter transform Inclusion and exclusion operation.

Accordingly, to correct this issue in the records database 130, the records system 120 may utilize the data structure illustrated with respect to FIG. 13. As shown the data structure in includes a study record retrieved from the database 130, an instance record retrieved from the database 130, and sequence data retrieved from a sequencing subsystem. FIG. 14 is an illustration of an example sequence of operations 150 that may be used to correct sequence data for studies in the records database 130. FIG. 15 is an illustration of the stages of a filter transform Inclusion and exclusion operation.

An example output file 157 generated from the sequencing operations 150 is:

```
{
  "ObfuscationMethod": 0,
  "Timestamp": "2021-06-23T07:11:03.1632837Z",
  "OperationComment": "Sequencing Check: All Studies (Query Success)",
  "Results": [
    {
      "StudyKey": "Study@@1.2.840.113711.17102019064526417.885005052771958@@1111",
      "CTime": 1571337933,
      "MTime": 1571337933,
      "DTime": 1557791131,
      "StudyUID": "1.2.840.113711.17102019064526417.885005052771958",
      "Date": "20190513",
      "Modalities": [
        "MR"
      ],
      "InstanceCount": 4,
      "Instances": [
        {
          "InstanceKey": "Instance@@1.2.840.113711.17102019064526716.127463784000454.120.19611200450@@",
          "CTime": 1571337933,
          "MTime": 1571337933,
          "InstanceUID": "1.2.840.113711.17102019064526716.127463784000454.120.19611200450",
          "SOPClassUID": ""
        },
        {
          "InstanceKey": "Instance@@1.2.840.113711.17102019064527268.267931936819822.433.33759103829@@",
          "CTime": 1571337934,
          "MTime": 1571337934,
          "InstanceUID": "1.2.840.113711.17102019064527268.267931936819822.433.33759103829",
          "SOPClassUID": "1.2.840.10008.5.1.4.1.1.4"
        },
        {
          "InstanceKey": "Instance@@1.2.840.113711.17102019064527887.874528887373806.899.12273535647@@",
          "CTime": 1571337934,
          "MTime": 1571337934,
          "InstanceUID": "1.2.840.113711.17102019064527887.874528887373806.899.12273535647",
          "SOPClassUID": "1.2.840.10008.5.1.4.1.1.4"
        },
        {
          "InstanceKey": "Instance@@1.2.840.113711.17102019064528398.407666132402353.530.23118879440@@",
          "CTime": 1571337934,
          "MTime": 1571337934,
          "InstanceUID": "1.2.840.113711.17102019064528398.407666132402353.530.23118879440",
          "SOPClassUID": "1.2.840.10008.5.1.4.1.1.4"
        }
      ],
      "SequencedInstanceUIDs": ["1.2.840.113711.17102019064526716.127463784000454.120.19611200450",
"1.2.840.113711.17102019064528398.407666132402353.530.23118879440"]
    }
  ],
  "Count": 1,
  "InstanceCount": 4
}
```

An example audit output file 157 the sequencing operations 150 is:

```
{
  "ObfuscationMethod": 0,
  "Timestamp": "2021-06-24T20:36:19.7951059Z",
  "OperationComment": "Sequencing Check: All Studies (Update Backfill Success Audit Entries)",
```

-continued

```
  "Results": [
    {
      "msg": {
        "_type": "AuditEvent",
        "event": {
          "type": {
            "code": "110110",
```

```
        "system":
        "http://dicom.nema.org/resources/ontology/DCM",
        "display": "Study Record"
      },
      "action": "D",
      "subtype": {
        "code": "6000",
        "system": "IINEventSubtype",
        "display": "SequencingCheck"
      },
      "datetime": "2021-06-24T13:36:20.8105126-07:00",
      "unixTimeSec": 1624566980,
      "outcome": "0",
      "outcomeDescription": "Sequencing Check: Sequencing
        Backfill Update",
      "businessEvent": "InvalidUninitializedBusinessEvent"
    },
    "agent": [
      {
        "role": {
          "coding": [
            {
              "code": "110153",
              "system":
                "http://dicom.nema.org/resources/ontology/DCM",
              "display": "Source Role ID"
            }
          ],
          "text": "Source"
        },
        "userId": {
          "use": "official",
          "value": "CORPORATE\\elwong"
        },
        "requestor": true,
        "network": {
          "type": "2",
          "address": "192.168.0.104"
        }
      }
    ],
    "source": {
      "Identifier": {
        "use": "normal",
        "value": "Ipi.Utilities.CBDataCleanupTool"
      },
      "type": {
        "code": "2",
        "system": "http://hl7.org/fhir/ValueSet/audit-source-type",
        "display": "Data Interface"
      }
    },
    "entity": [
      {
        "identifier": {
          "use": "official",
          "type": {
            "code": "110180",
            "system":
              "http://dicom.nema.org/resources/ontology/DCM",
            "display": "Study UID"
          },
          "value":
            "1.2.840.113711.17102019064526417.885005052771958"
        },
        "type": {
          "code": "2",
          "system":
            "http://terminology.hl7.org/CodeSystem/audit-entity-type",
          "display": "System"
        },
        "role": {
          "code": "3",
          "system": "http://hl7.org/fhir/ValueSet/object-role",
          "display": "Report"
        }
      }
    ]
  },
      "tenantId": null,
      "bizTxId": null,
      "bizProcId": null,
      "parentReqId": null,
      "reqId": null,
      "logType": "Audit",
      "logger": "Audit.Ipi.Business.Audit",
      "namespace": "Ipi.Utilities.CBDataCleanupTool",
      "objectProcessingFlag": null,
      "storageFlag": null,
      "version": null
    }
  ],
  "Count": 1
}
```

Figure 16:
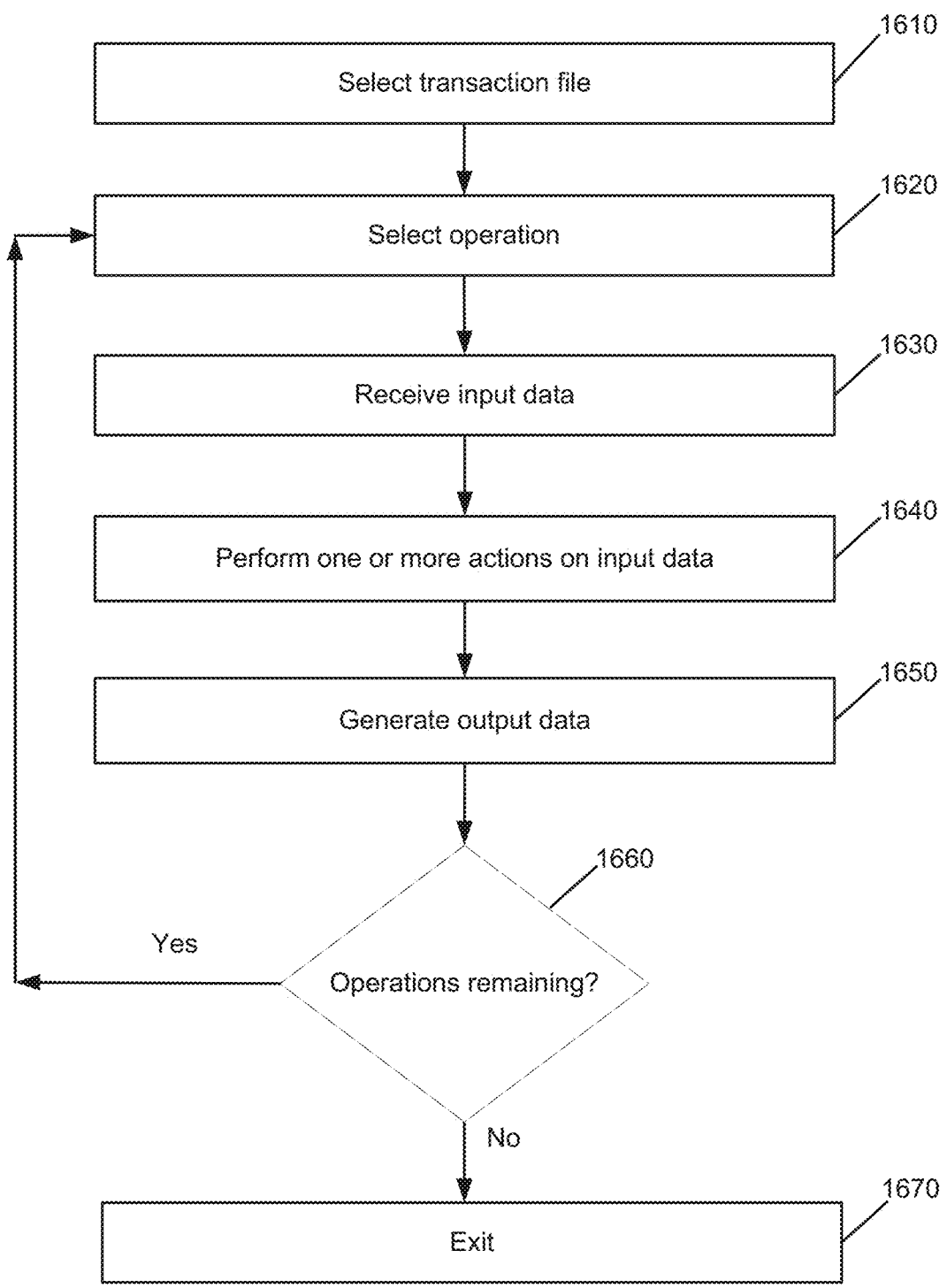
FIG. 16 is an illustration of an example method for executing operations in a transaction file.

FIG. 16 is an illustration of an example method for executing operations in a transaction file. The method 1600 may be implemented by the records system 120.

At 1610, a transaction file is selected. The transaction file 140 may be selected by the records system 120. The transaction file 140 may include a plurality of operations 150 and may be related to processes being performed on records of a records database 130. Example processes include removing duplicate records and adding sequencing data to one or more image studies stored in the database 130. Other actions may be supported.

At 1620, an operation is selected. The operation 150 may be selected for execution by the records system 120. In some embodiments, the records system 120 may select a next operation 150 in the transaction file 140.

At 1630, input data is received. The input data be received by the records system 120 for the operation 150. The input data may include an input file 155 generated by a previous operation 150 or the results of a query on the records database 130. The input data may not be received directly from a previously executed operation 150.

At 1640, one or more actions are performed on the input data. The one or more more actions may be performed by the records system 120. The actions may include transformation actions, inclusion action, and exclusion actions. Other types of actions may be supported.

At 1650, output data is generated. The output data may be generated by the records system 120 upon executing the selected operation. The output data may include one or more more output files 157 that may be used as input data to one or more subsequent operations 150 in the transaction file 140. Depending on the embodiment, the output data may include values of one or more properties that are obfuscated according to one or more flags set in the operation 150. The flags may include encryption flags, random value flags, and redaction flags. Other flags may be supported.

At 1660, whether there are any operations remaining in the transaction file is determined. The determination may be made by the records system 120. If there are remaining operations 150, then the method 1600 may continue at 1620 where a next operation 150 in the transaction file 140 may be selected by the records system 120. Else, the method 1600 may exit at 1670.

Figure 17:
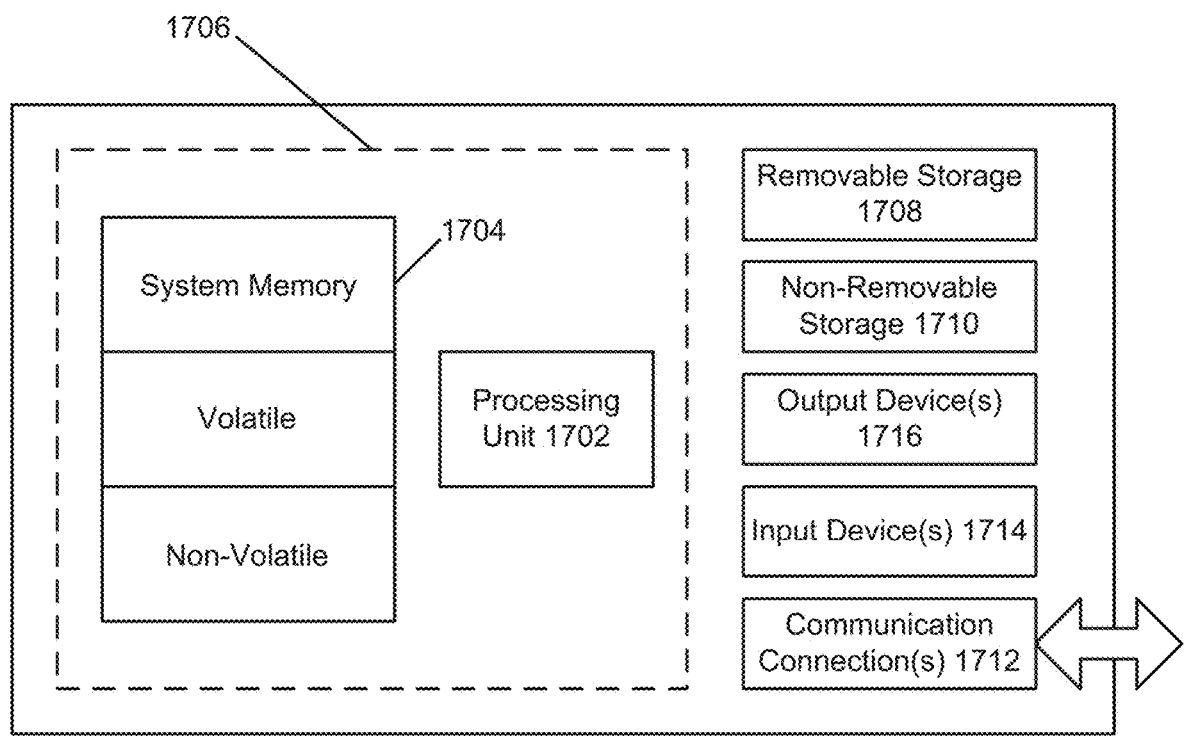
FIG. 17 shows an exemplary computing environment in which example embodiments and aspects may be implemented.

FIG. 17 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used.

Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 17, an exemplary system for implementing aspects described herein includes a computing device, such as computing device 1700. In its most basic configuration, computing device 1700 typically includes at least one processing unit 1702 and memory 1704. Depending on the exact configuration and type of computing device, memory 1704 may be volatile (such as random access memory (RAM)), non-volatile (such as read-only memory (ROM), flash memory, etc.), or some combination of the two. This most basic configuration is illustrated in FIG. 17 by dashed line 1706.

Computing device 1700 may have additional features/functionality. For example, computing device 1700 may include additional storage (removable and/or non-removable) including, but not limited to, magnetic or optical disks or tape. Such additional storage is illustrated in FIG. 17 by removable storage 1708 and non-removable storage 1710.

Computing device 1700 typically includes a variety of computer readable media. Computer readable media can be any available media that can be accessed by the device 1700 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 1704, removable storage 1708, and non-removable storage 1710 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1700. Any such computer storage media may be part of computing device 1700.

Computing device 1700 may contain communication connection(s) 1712 that allow the device to communicate with other devices. Computing device 1700 may also have input device(s) 1714 such as a keyboard, mouse, pen, voice input device, touch input device, etc. Output device(s) 1716 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system comprising:
one or more processors; and
one or more memories storing processor-executable instructions that, when executed by the one or more processors, cause the one or more processors to perform operations comprising:
selecting a transaction file comprising a plurality of ordered operations for removing duplicate records from a plurality of records, the plurality of ordered operations including a query operation and a filter operation;
executing the query operation, at least in part by:
for each patient item of a plurality of patient items, performing a respective one or more patient record queries to attempt to populate a respective patient data structure of a plurality of patient data structures; and
generating a plurality of output files of the query operation, wherein the plurality of output files of the query operation includes a success file that includes information about ones of the plurality of patient data structures that are fully populated and a failure file that includes information about ones of the plurality of patient data structures that are not fully populated; and
executing the filter operation using the plurality of output files of the query operation as input data for the filter operation, wherein executing the filter operation includes performing inclusion and exclusion operations based at least in part on the success file and the failure file.

2. The system of claim 1, wherein the plurality of output files includes JSON files.

3. The system of claim 1, wherein the plurality of ordered operations further includes one or more of: (i) one or more transform operations, (ii) one or more update operations, (iii) one or more statistic operations, (iv) one or more sequence fix operations, (v) one or more sequence check operations, or (vi) one or more audit operations.

4. The system of claim 1, wherein the plurality of ordered operations further includes one or more of:
one or more duplicate patient record update operations;
one or more duplicate patient updated record query operations;
one or more patient updated record rollback operations; or
one or more duplicate patient audit operations.

5. The system of claim 1, wherein the plurality of ordered operations are arranged according to a branching order.

6. The system of claim 1, wherein at least one operation of the plurality of ordered operations sets one or more of an obfuscation flag, an encryption flag, or a redaction flag.

7. A method for updating and validating medical records comprising:
selecting, by one or more processors, a transaction file comprising a plurality of ordered operations for removing duplicate records from a plurality of records, the plurality of ordered operations including a query operation and a filter operation;
executing, by the one or more processors, the query operation, wherein executing the query operation comprises:
for each patient item of a plurality of patient items, performing a respective one or more patient record queries to attempt to populate a respective patient data structure of a plurality of patient data structures; and
generating a plurality of output files of the query operation, wherein the plurality of output files of the query operation includes a success file that includes information about ones of the plurality of patient data structures that are fully populated and a failure file that includes information about ones of the plurality of patient data structures that are not fully populated; and
executing, by the one or more processors, the filter operation using the plurality of output files of the query operation as input data for the filter operation, wherein executing the filter operation includes performing inclusion and exclusion operations based at least in part on the success file and the failure file.

8. The method of claim 7, wherein the plurality of output files includes JSON files.

9. The method of claim 8, wherein the plurality of ordered operations further includes transform operations, update operations, statistic operations, sequence fix operations, sequence check operations, and audit operations.

10. The method of claim 8, wherein the plurality of ordered operations further includes one or more of:
one or more duplicate patient record update operations;
one or more duplicate patient updated record query operations;
one or more patient updated record rollback operations; or
one or more duplicate patient audit operations.

11. The method of claim 7, wherein the plurality of ordered operations are arranged according to a branching order.

12. The method of claim 7, wherein at least one operation of the plurality of ordered operations sets one or more of an obfuscation flag, an encryption flag, or a redaction flag.

13. One or more non-transitory computer-readable media storing processor-executable instructions that, when executed by one or more processors, cause the one or more processors to perform operations comprising:
selecting a transaction file comprising a plurality of ordered operations for removing duplicate records from a plurality of records, the plurality of ordered operations including a query operation and a filter operation;
executing the query operation, wherein executing the query operation comprises:
for each patient item of a plurality of patient items, performing a respective one or more patient record queries to attempt to populate a respective patient data structure of a plurality of patient data structures; and
generating a plurality of output files of the query operation, wherein the plurality of output files of the query operation includes a success file that includes information about ones of the plurality of patient data structures that are fully populated and a failure file that includes information about ones of the plurality of patient data structures that are not fully populated; and
executing the filter operation using the plurality of output files of the query operation as input data for the filter operation, wherein executing the filter operation includes performing inclusion and exclusion operations based at least in part on the success file and the failure file.

14. The one or more non-transitory computer-readable media of claim 13, wherein the plurality of output files includes JSON files.

* * * * *